United States Patent
Bhadra et al.

(10) Patent No.: US 10,744,450 B2
(45) Date of Patent: Aug. 18, 2020

(54) MULTI-BED RAPID CYCLE KINETIC PSA

(71) Applicant: Air Products and Chemicals, Inc., Allentown, PA (US)

(72) Inventors: Shubhra Jyoti Bhadra, Macungie, PA (US); Roger Dean Whitley, Allentown, PA (US); Timothy Christopher Golden, Nantes (FR); Dingjun Wu, Macungie, PA (US); Glenn Paul Wagner, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 113 days.

(21) Appl. No.: 16/103,569

(22) Filed: Aug. 14, 2018

(65) Prior Publication Data

US 2020/0054987 A1   Feb. 20, 2020

(51) Int. Cl.
   *B01D 53/047*   (2006.01)
   *B01D 53/04*   (2006.01)
   *B01D 53/06*   (2006.01)

(52) U.S. Cl.
   CPC ..... *B01D 53/0473* (2013.01); *B01D 53/0446* (2013.01); *B01D 53/06* (2013.01);
   (Continued)

(58) Field of Classification Search
   CPC ........... B01D 53/0446; B01D 53/0473; B01D 53/04; B01D 53/047; B01D 2253/102; B01D 2253/1085; B01D 2257/104; B01D 2246/10; B01D 2246/12; B01D 2246/18; B01D 2259/40005; B01D 2259/40013; B01D 2259/4002; B01D 2259/40028; B01D 2259/40035; B01D 2259/40037; B01D 2259/40052; B01D 2259/40056; B01D 2259/40069; B01D 2259/40079;
   (Continued)

(56) References Cited

U.S. PATENT DOCUMENTS 3,801,513 A   4/1974   Munzner et al.
4,458,022 A   7/1984   Ohsaki et al.
(Continued)

FOREIGN PATENT DOCUMENTS

CN   202337689 U   7/2012
CN   103787285 A   5/2014
(Continued)

OTHER PUBLICATIONS

Chagger, H.K., et al.; "Kinetics of Adsorption and Diffusional Characteristics of Carbon Molecular Services"; Pergamon; Elsevier Science Ltd.; Carbon vol. 33, No. 10; pp. 1405-1411; 1995.
(Continued)

*Primary Examiner* — Frank M Lawrence, Jr.
(74) *Attorney, Agent, or Firm* — Matthew R. Weaver

(57) ABSTRACT

Disclosed herein are multi-bed rapid cycle pressure swing adsorption (RCPSA) processes for separating $O_2$ from $N_2$ and/or Ar, wherein the process utilizes at least five adsorption beds each comprising a kinetically selective adsorbent for $O_2$ having an $O_2$ adsorption rate (1/s) of at least 0.20 as determined by linear driving force model at 1 atma and 86° F.

24 Claims, 21 Drawing Sheets

(52) U.S. Cl.
CPC ............... *B01D 2253/102* (2013.01); *B01D 2253/1085* (2013.01); *B01D 2259/4002* (2013.01); *B01D 2259/40005* (2013.01); *B01D 2259/40013* (2013.01); *B01D 2259/40028* (2013.01); *B01D 2259/40035* (2013.01); *B01D 2259/40052* (2013.01); *B01D 2259/4063* (2013.01); *B01D 2259/4066* (2013.01); *B01D 2259/40067* (2013.01); *B01D 2259/40079* (2013.01); *B01D 2259/40081* (2013.01)

(58) Field of Classification Search
CPC .. B01D 2259/40081; B01D 2259/4061; B01D 2259/4063; B01D 2259/4066; C01B 13/00; C01B 21/00; C01B 23/00
USPC ..... 95/127, 130, 138, 900, 903; 128/205.27; 502/416
See application file for complete search history.

(56) References Cited

U.S. PATENT DOCUMENTS

| | | | |
|---|---|---|---|
| 4,548,799 A | 10/1985 | Knoblauch et al. | |
| 4,589,888 A | 5/1986 | Hiscock et al. | |
| 4,742,040 A | 5/1988 | Ohsaki et al. | |
| 4,938,939 A | 7/1990 | Kuznicki | |
| 5,098,880 A | 3/1992 | Gaffney et al. | |
| 5,164,355 A | 11/1992 | Farris et al. | |
| 5,240,474 A * | 8/1993 | Auvil ............... | B01D 53/02 95/96 |
| 5,447,557 A * | 9/1995 | Golden ............. | B01D 53/02 95/96 |
| 5,871,565 A * | 2/1999 | Leavitt ............. | B01D 53/0476 95/100 |
| 5,972,834 A | 10/1999 | Ohsaki et al. | |
| 6,051,050 A | 4/2000 | Keefer et al. | |
| 6,451,095 B1 | 9/2002 | Keefer et al. | |
| 6,565,628 B2 | 5/2003 | Xu et al. | |
| 6,767,386 B2 | 7/2004 | Kawai et al. | |
| 6,916,358 B2 | 7/2005 | Nakamura et al. | |
| 7,645,324 B2 | 1/2010 | Rode et al. | |
| 7,651,549 B2 | 1/2010 | Whitley | |
| 7,670,408 B2 | 3/2010 | Ota | |
| 8,470,395 B2 | 6/2013 | Khiavi et al. | |
| 9,359,203 B2 | 6/2016 | Kokubu et al. | |
| 9,403,118 B2 | 8/2016 | Sakamoto et al. | |
| 9,669,349 B1 | 6/2017 | Lau et al. | |
| 9,895,646 B2 | 2/2018 | Monereau et al. | |
| 9,925,514 B2 | 3/2018 | Coe et al. | |
| 2005/0257685 A1 | 11/2005 | Baksh et al. | |
| 2008/0282886 A1 | 11/2008 | Reyes et al. | |
| 2014/0060326 A1 | 3/2014 | Sundaram | |
| 2014/0076164 A1 | 3/2014 | Monereau et al. | |
| 2017/0144101 A1 | 5/2017 | Tanaka et al. | |

FOREIGN PATENT DOCUMENTS

| | | |
|---|---|---|
| CN | 101318634 | 12/2014 |
| EP | 0620035 | 10/1993 |
| EP | 2823872 A2 | 1/2015 |
| KR | 10-1659760 B1 | 9/2016 |
| WO | 2008/089564 A1 | 7/2008 |
| WO | 2015199227 A1 | 12/2015 |
| WO | 2017058486 A1 | 4/2017 |

OTHER PUBLICATIONS

Chen, Y.D., et al.; "Diffusion of Oxygen, Nitrogen and Their Mixtures in Carbon Molecular Sieve"; AIChE Journal; Apr. 1994; vol. 40, No. 4; pp. 577-585.

Kumar, R., et al.; "A Versatile Process Simulator for Adsorptive Separations"; Pergamon; Elsevier Science Ltd.; Chemical Enginering Science; 1994; vol. 49, No. 18; pp. 3115-3125.

Nakano, Y.; "Control of Micro-pores of Molecular Sieving Carbon by Impregnation of Hydrocarbons and Heat Treatment"; Presented at 20th Spring Chemical Industrial Convention; 1987.

Reid, C.R., et al.; "Adsorption of Gases on Carbon Molecular Sieves Used for Air Separation. Spherical Adsorptives as Probes for Kinetic Selectivity"; Langmuir; 1998; 14; pp. 2415-2425.

Reid, C.R., et al.; "Adsorption of Gases on Carbon Molecular Sieve Used for Air Separation. Linear Adsorptives as Probes for Kinetic Selectivity"; Langmuir; 1999; 15; pp. 3206-3218.

Schork, J.M., et al.; "A Shortcut Computational Method for Designing N2 PSA Adsorbents"; Ind. Eng. Chem. Res.; 1993; vol. 32; pp. 2226-2235.

Walker, P.L., Jr.; "Molecular Sieves"; Mineral Industries; Jan. 1966; pp. 1-7.

Nguyen, C. et al, "Dual Langmuir kinetic model for adsorption in carbon molecular sieve", Langmuir, vol. 16, pp. 1868-1873, 2000.

Sircar S. et al, "Why Does the Linear Driving Force Model for Adsorption Kinetics Work?", Adsorption 2000, 6, 137-147.

Mehrotra, A. et al, "Simplified Graphical Approach for Complex PSA Cycle Scheduling", Adsorption, 2011, 17 337-345.

Babicki, M., et al.; "PSA Technology Hits the Fast Lane"; Chemical Processing; PutmanMedia; Aug. 2003; pp. 1-6.

Delgado, J.A., et al.; "Numerical Simulation of a Three-Bed PSA Cycle for the Methane/Nitrogen Separation with Silicalite"; Elsevier; Separation and Purification Technology; vol. 77; 2011; pp. 7-17.

Yavary, M., et al.; "The Effect of Number of Pressure Equalization Steps on the Performance of Pressure Swing Adsorption Process"; Elsevier, Chemical Engineering and Processing; vol. 87; 2015; pp. 35-44.

U.S. Appl. No. 15/718,620, filed Sep. 28, 2017 entitled Processes Using Improved Rho Adsorbent Compositions with first named inventor Shubhra Jyoti Bhadra.

U.S. Appl. No. 15/718,467, filed Sep. 28, 2017 entitled Rho Adsorbent Compositions, Methods of Making and Using Them with first named inventor Magdalena M. Lozinska.

Grande, Carlos A.; "Advances in Pressure Swing Adsorption for Gas Separation"; ISRN Chemical Engineering; vol. 2012, Article ID 982934; Oct. 2012, 13 pgs.

* cited by examiner

MULTI-BED RAPID CYCLE KINETIC PSA

TECHNICAL FIELD

The invention relates to a multi-bed rapid cycle pressure swing adsorption (PSA) process for separating $O_2$ from $N_2$ and/or Ar.

BACKGROUND

PSA processes have long been used for the separation of the components of air. More recently, there has been considerable interest in the intensification of separation processes. In cyclic processes such as PSA and TSA, reducing cycle time is the primary means of achieving more production from a given quantity of material. However, as cycle time is reduced, cyclic processes usually face the problem of decreasing working capacity per cycle for the component of interest, decreasing product recovery, and increasing pressure drop.

Recent developments in PSA processes involve using adsorbents with faster adsorption kinetics, such as relatively fast kinetically selective laminate adsorbent structures, to increase productivity. However, such improvements in productivity generally come at the expense of reduced selectivity, resulting in reduced product recovery. Other developments include the use of adsorbents with relatively slow adsorption kinetics to improve overall product recovery of the processes. However, the improvement in product recovery generally comes at the expense of reduced process productivity.

U.S. Pat. No. 7,645,324 discloses a rotary PSA process using a laminated adsorbent for kinetic separation of gases. U.S. Pat. No. 7,645,324 teaches that the use of the kinetically selective laminate can allow for increased productivity, but in order to avoid the masking of kinetic selectivity by macropore mass transfer resistance the macropore structure within the adsorbent layer should be as open as possible; i.e., the macropore void fraction should be relatively high. A problem in this respect, however, is that having a high void volume generally harms product recovery.

U.S. Pat. No. 9,895,646 discloses a multi-bed PSA process for producing a gas stream enriched in a compound X from a feed gas stream. U.S. Pat. No. 9,895,646 notes that introducing pressure equalization steps into a PSA process improves product recovery, but doing so is generally detrimental to the specific productivity of the process. It is noted that moving from 1 to 3 equalizations makes it possible to gain 2.5% regarding the efficiency, but to the detriment of an increase of 40% in the volume of adsorbent (due to more adsorbent beds being required). Thus, increasing the number of adsorbent beds allows for increased product recovery (as more pressure equalization steps can be performed), however that also leads to a decrease in the specific productivity of the process (standard volumetric flow rate of product divided by total amount of adsorbent in the system).

WO 2015/199227 discloses a multi-bed (3 or more beds) PSA process for separating methane from biogas. The process performs a pressure equalization process of transferring the gas in an adsorption tower in which the adsorption process has been finished and which is in the high pressure state into another adsorption tower that is in a lower pressure state so as to bring the inside of the adsorption tower into an intermediate pressure state, and a pressure equalization process of receiving, after finishing the decompression process, the gas from another adsorption tower that is in a higher pressure state so as to bring the inside of the adsorption tower into an intermediate pressure state. This is said to improve the efficiency of the energy required for pressure increase and pressure lowering in the adsorption towers, and also improve the recovery rate of a gas to be purified, while improving the purity of the gas to be purified. However, adding the pressure equalization step did not improve the specific productivity of the process. No kinetic information is provided for the adsorbents used, however the requirement of a long pressure transfer step (6 seconds) indicates that a slow kinetic adsorbent was used.

To summarize the above, it is known that adsorbents that have relatively fast adsorption rates can increase process productivity, but that this generally comes at a cost of lower product recovery due to higher void volumes and/or reduced levels of selectivity. Introducing more adsorbent beds and pressure equalization steps into a process that uses said adsorbents could, in theory, improve upon that low product recovery rate, however it is expected that doing so would come at the cost of cancelling out the improvements in productivity intended to be obtained by using the faster adsorbents in the first place. Alternatively, a slower, more selective kinetic adsorbent can be used to obtain high purity product with good product recovery, however that also comes at the cost of reducing the overall productivity of the process.

It is therefore evident from the prior art that there is a trade-off between product recovery and process productivity; process modifications that increase product recovery are generally detrimental to process productivity, and vice versa.

Accordingly, there remains a need for PSA processes that have high process productivity whilst maintaining high product recovery.

SUMMARY OF THE INVENTION

The present inventors have found that when using "slower" kinetic adsorbents for separating $O_2$ from $N_2$ or Ar via pressure swing adsorption (PSA), switching from a 2 bed PSA process to a PSA process with 5 or more adsorbent beds lowered specific productivity and had little effect on recovery. Surprisingly, however, when using "faster" kinetic adsorbents in a rapid PSA cycle, higher specific productivity could be achieved whilst maintaining product recovery when changing from a 2 bed to a 5 or more bed PSA process and incorporating into the process at least two "true" pressure equalization depressurization and pressure equalization re-pressurization steps (i.e. wherein the pairing of beds involved in the first pressure equalization depressurization and first pressure equalization re-pressurization steps is different to the pairing of beds involved in the second pressure equalization depressurization and second pressure equalization re-pressurization steps). Accordingly, the present inventors have now developed multi-bed rapid cycle PSA processes for separating $O_2$ from $N_2$ or Ar that have excellent product recovery and process productivity.

Several preferred aspects of processes according to the present invention are outlined below.

Aspect 1: A multi-bed rapid cycle pressure swing adsorption (RCPSA) process for separating $O_2$ from $N_2$ and/or Ar, wherein the process utilizes at least five adsorption beds each comprising a kinetically selective adsorbent for $O_2$ having an $O_2$ adsorption rate (1/s) of at least 0.20 as determined by linear driving force model at 1 atma and 86° F., and wherein the RCPSA process comprises subjecting each of the adsorption beds to a rapid PSA cycle comprising the following steps carried out in the following sequence:
i) feed ii) a first equalization depressurization
iii) a second equalization depressurization
iv) counter-current depressurization
v) counter-current purge
vi) a first equalization re-pressurization
vii) a second equalization re-pressurization
viii) product and/or feed re-pressurization
wherein when an adsorbent bed is undergoing equalization depressurization step ii) it is connected with and provides a re-pressurization stream to one of the other adsorbent beds that is concurrently undergoing equalization re-pressurization step vii), and when an adsorbent bed is undergoing equalization depressurization step iii) it is connected with and provides a re-pressurization stream to another one of the other adsorbent beds that is concurrently undergoing equalization re-pressurization step vi).

Aspect 2: The RCPSA process of Aspect 1, wherein step iii) is a dual equalization depressurization step and step vi) is a dual equalization re-pressurization step.

Aspect 3: The RCPSA process of Aspect 1 or 2, wherein step viii) is a product and feed re-pressurization step.

Aspect 4: The RCPSA process of any one of Aspects 1 to 3, wherein step ii) is a co-current equalization depressurization step and step vii) is a counter-current equalization re-pressurization step.

Aspect 5: The RCPSA process of any one of Aspects 1 to 4, wherein the process utilizes from 5 to 18 adsorption beds.

Aspect 6: The RCPSA process of any one of Aspects 1 to 4, wherein the process utilizes from 7 to 9 adsorption beds.

Aspect 7: The RCPSA process of any one of Aspects 1 to 4, wherein the process utilizes 7 or 9 adsorption beds.

Aspect 8: The RCPSA process of any one of Aspects 1 to 7, wherein the duration of the feed step is from 3 to 45 seconds.

Aspect 9: The RCPSA process of any one of Aspects 1 to 8, wherein the duration of each of the equalization depressurization and equalization re-pressurization steps is from 1 and 5 seconds.

Aspect 10: The RCPSA process of any one of Aspects 1 to 9, wherein the cycle time of the rapid PSA cycle is equal to or less than 100 seconds.

Aspect 11: The RCPSA process of any one of Aspects 1 to 10, wherein the feed step is performed at a temperature of 0° F. to 125° F.

Aspect 12: The RCPSA process of any one of Aspects 1 to 10, wherein the feed step is performed at a temperature of 20° F. to 100° F.

Aspect 13: The RCPSA process of any one of Aspects 1 to 10, wherein the feed step is performed at a temperature of 20° F. to 40° F.

Aspect 14: The RCPSA process of any one of Aspects 1 to 13, wherein during all or part of the feed step a recycle gas is introduced co-currently into the bed undergoing the feed step, the recycle gas comprising gas obtained during the counter-current depressurization step and/or purge step from the beds undergoing said steps.

Aspect 15: The RCPSA process of any one of Aspects 1 to 14, wherein during all or part of equalization depressurization step ii) a recycle gas is introduced co-currently into the bed undergoing said step, the recycle gas comprising gas obtained during the counter-current depressurization step and/or purge step from the beds undergoing said steps.

Aspect 16: The RCPSA process of any one of Aspects 1 to 15, wherein the kinetically selective adsorbent has an $O_2/N_2$ kinetic selectivity of at least 5 as determined by linear driving force model at 1 atma and 86° F., and/or $O_2/Ar$ kinetic selectivity of at least 5 as determined by linear driving force model at 1 atma and 86° F.

Aspect 17: The RCPSA process of any one of Aspects 1 to 16, wherein the kinetically selective adsorbent is a zeolite or a carbon molecular sieve.

Aspect 18: The RCPSA process of any one of Aspects 1 to 17, wherein the process is for separating $O_2$ from Ar, and the kinetically selective adsorbent is a RHO zeolite having a Si/Al ratio of from 3.2 to 4.5 and containing non-proton extra-framework cations, wherein the zeolite contains at most 1 proton per unit cell, and wherein the size, number and charge of the extra-framework cations that are present in the zeolite are such that 1 or fewer non-proton extra-framework cations per unit cell are required to occupy 8-ring sites.

Aspect 19: The RCPSA process of any one of Aspects 1 to 17, wherein the process is for separating $O_2$ from $N_2$, and the kinetically selective adsorbent is a carbon molecular sieve (CMS) having an $O_2/N_2$ kinetic selectivity of from 5 to 30 as determined by linear driving force model at 1 atma and 86° F.

Aspect 20: The RCPSA process of any one of Aspects 1 to 19, wherein the process is a rotary bed RCPSA process.

Aspect 21: The RCPSA process of any one of Aspects 1 to 19, wherein the process is a rotary valve RCPSA process.

Aspect 22: The RCPSA process of any one of Aspects 1 to 21, wherein each adsorbent bed has a void volume relative to bed volume of 3% to 15%.

Aspect 23: The RCPSA process of any one of Aspects 1 to 22, wherein the process utilizes seven adsorption beds, and wherein the RCPSA process comprises subjecting each of the beds to a rapid PSA cycle comprising the following steps carried out in the following sequence:
feed (F);
co-current equalization depressurization (EQD1);
dual equalization depressurization (DEQD2);
counter-current depressurization (CnD);
counter-current purge (PU);
dual equalization re-pressurization (DEQR2);
counter-current equalization re-pressurization (EQR1); and
product and feed re-pressurization (RP/F);
wherein when an adsorbent bed is undergoing the co-current equalization depressurization (EQD1) step it is connected with and provides a counter-current re-pressurization stream to one of the other adsorbent beds that is concurrently undergoing the counter-current equalization re-pressurization (EQR1) step, and
wherein when an adsorbent bed is undergoing the dual equalization depressurization (DEQD2) step it is connected with and provides co-current and counter-current re-pressurization streams to another one of the other adsorbent beds that is concurrently undergoing the dual equalization re-pressurization (DEQR2) step.

Aspect 24: The RCPSA process of any one of Aspects 1 to 22, wherein the process utilizes nine adsorption beds, and wherein the RCPSA process comprises subjecting each of the beds to a rapid PSA cycle comprising the following steps carried out in the following sequence:
feed (F);
co-current equalization depressurization (EQD1);
first dual equalization depressurization (DEQD2);
second dual equalization depressurization (DEQD3);
counter-current depressurization (CnD);
counter-current purge (PU);
first dual equalization re-pressurization (DEQR3);
second dual equalization re-pressurization (DEQR2);

counter-current equalization re-pressurization (EQR1); and product and feed re-pressurization (RP/F);
wherein when an adsorbent bed is undergoing the co-current equalization depressurization (EQD1) step it is connected with and provides a counter-current re-pressurization stream to one of the other adsorbent beds that is concurrently undergoing the counter-current equalization re-pressurization (EQR1) step, and
wherein when an adsorbent bed is undergoing the first dual equalization depressurization (DEQD2) step it is connected with and provides co-current and counter-current re-pressurization streams to another one of the adsorbent beds that is concurrently undergoing the second dual equalization re-pressurization (DEQR2) step, and wherein when an adsorbent bed is undergoing the second dual equalization depressurization (DEQD3) step it is connected with and provides a co-current and counter-current re-pressurization streams to yet another one of the adsorbent beds that is concurrently undergoing the first dual equalization re-pressurization (DEQR3) step.

DESCRIPTION OF THE INVENTION

Figure 1:
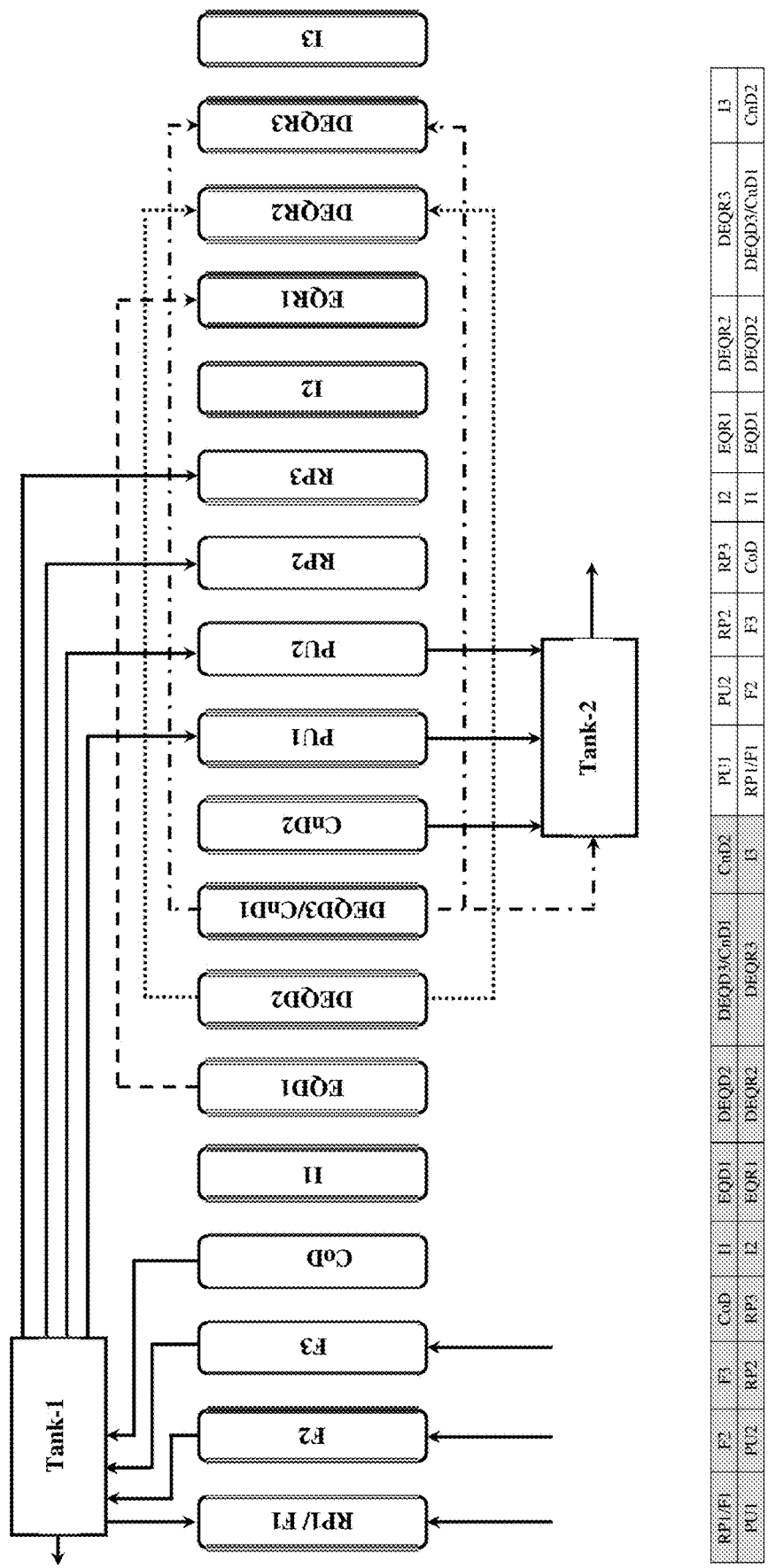
FIG. 1 shows the operation of a 2-bed multi-step PSA cycle.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

As used herein, "first," "second," "third," etc. are used to distinguish from among a plurality of steps and/or features, and are not indicative of the total number, or relative position in time and/or space unless expressly stated as such.

As used herein, the term "comprising" means consisting of or including.

As used herein, the phrase "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

Disclosed herein a multi-bed rapid cycle pressure swing adsorption (RCPSA) process for separating $O_2$ from $N_2$ and/or Ar, wherein the process utilizes at least five adsorption beds each comprising a "fast" kinetically selective adsorbent for $O_2$, the PSA cycle including at least two "true" pressure equalization depressurization steps and two "true" pressure equalization re-pressurization steps. Such processes have been found to provide both good product recovery and good process productivity.

As used herein, the term "fast" kinetically selective adsorbent for $O_2$ means a kinetically selective adsorbent for $O_2$ having an $O_2$ adsorption rate (1/s) of at least 0.20 as determined by linear driving force model at 1 atma and 86° F. More preferably, the fast CMS adsorbent has an $O_2$ adsorption rate (1/s) of at least 0.21, at least 0.22, at least 0.23, at least 0.24, at least 0.25, at least 0.26, at least 0.27, at least 0.28, at least 0.29, or at least 0.30, as determined by linear driving force model at 1 atma and 86° F.

As used herein, the term "slow" kinetically selective adsorbent for $O_2$ means a kinetically selective adsorbent for $O_2$ having an $O_2$ adsorption rate (1/s) of less than 0.2000 as determined by linear driving force model at 1 atma and 86° F.

The linear driving force (LDF) model is a well-known model for determining adsorption rates from experimental uptake curves and can be used to calculate both the adsorption rates of particular adsorbates on a particular adsorbent, and the resulting kinetic selectivity of an adsorbent for particular adsorbate parings.

More specifically, the rates of adsorption of an adsorbate (e.g. $O_2$, $N_2$, or Ar) on an adsorbent is evaluated using a standard volumetric adsorption apparatus. The experiment consists of exposing an adsorbent sample, which is initially at vacuum and 303 K (86° F.), to a measured amount of the adsorbate at 1 atma (760 Torr/101 kPa) at the same temperature. The change in pressure is recorded as a function of time. The pressure time data is then subtracted from a similar pressure history using the same weight of quartz beads in the place of the adsorbent sample to obtain a plot of the amount of gas adsorbed as a function of time, also known as an uptake curve. The LDF model is then used to extract the adsorption rates of the adsorbate in units of inverse time (1/s) from the uptake curve. The selectivity of the adsorbent for a particular adsorbate paring can in turn be determined from the ratio of the calculated adsorption rate for the two adsorbates individually. The analytical form of the model is given by the following equation (as also set forth in Table 1 in the literature by Sircar, S. and Hufton, J. R., "*Why Does the Linear Driving Force Model for Adsorption Kinetics Work?*", *Adsorption* 2000, 6 137-147) where f(t) is the fractional uptake, k is the LDF mass transfer coefficient, a is the correction factor for the constant volume experiment and t is the time.

$$f(t) = 1 - \exp^{-kt\frac{1+\alpha}{\alpha}}$$

As noted above, reference herein to two "true" pressure equalization depressurization steps and two "true" pressure equalization re-pressurization steps mean that the pairing of beds involved in the first pressure equalization depressurization and first pressure equalization re-pressurization steps is different to the pairing of beds involved in the second pressure equalization depressurization and second pressure equalization re-pressurization steps. For example if the first pressure equalization depressurization step in bed "A" takes place by said bed equalizing pressure with bed "B" (which is thus undergoing the first pressure equalization re-pressurization step) then in order for the second pressure equalization depressurization step to be a "true" second pressure equalization depressurization step said second pressure equalization depressurization in bed "A" must take place by said bed equalizing pressure with a third bed, bed "C" (that is thus undergoing the second pressure equalization re-pressurization step), and not with bed "B".

The RCPSA process involves subjecting each of the adsorption beds to a rapid PSA cycle comprising at least the following steps carried out in the following sequence: i) feed; ii) a first equalization depressurization; iii) a second equalization depressurization; iv) counter-current depressurization; v) counter-current purge; vi) a first equalization re-pressurization; vii) a second equalization re-pressurization; viii) product and/or feed re-pressurization. It should be noted that the cycle may include also other steps taking place before, after or between any of the steps listed above. When an adsorbent bed is undergoing first equalization depressurization step ii) it is connected with and provides a re-pressurization stream to one of the other adsorbent beds that is concurrently undergoing second equalization re-pressurization step vii); and when an adsorbent bed is undergoing second equalization depressurization step iii) it is connected with and provides a re-pressurization stream to another one of the other adsorbent beds that is concurrently undergoing first equalization re-pressurization step vi). The reference here to "another one" of the adsorbent beds indicates that the bed undergoing the cycle is, when undergoing step iii), connected to a different bed to the bed it was previously connected to when undergoing step ii). In other words, steps ii) and iii) represent two "true" pressure equalization depressurization step and steps vi) and vii) represent two "true" pressure equalization re-pressurization steps.

As used herein, the term "rapid" PSA cycle means that the total duration of the feed step of the cycle (i.e. step i) is preferably 45 seconds or less, the feed step (also commonly referred to as the adsorption step) being the step of the cycle in which the adsorbent bed is at elevated pressure (relative to the pressure in the bed during steps of the process) and a feed stream is being introduced into and passed through the bed to adsorb one or more components from the feed stream to produce a product stream exiting the bed that is depleted (relative to the composition of the feed stream) in the adsorbed component, as is well known in the art. Preferably the total duration of the feed step of the cycle is at least 3 seconds. Preferably the feed step has a total duration of from 3 to 45 seconds or from 3 to 16 seconds.

The rapid PSA cycle preferably also has a cycle time of 100 seconds or less, the cycle time being the amount of time taken to complete one full set of steps of the PSA cycle. More preferably the PSA cycle has a cycle time of 60 seconds or less, 50 seconds or less, or 40 seconds or less. Preferably the PSA cycle has a cycle time of at least 15 seconds.

It has been found that it is also preferable if each of the equalization depressurization steps and equalization re-pressurization steps has a duration of from 1 to 5 seconds. Faster than this (i.e. <1 seconds) can cause a reduction in the efficiency of the system, and slower than this (i.e. >5 seconds) increases the cycle time and can reduce overall productivity. Accordingly, each of steps ii), iii), vi) and vii) preferably has a duration of from 1 to 5 seconds. Furthermore, since steps ii) and vii) are linked and steps iii) and vi) are linked (steps ii) and vii) taking place concurrently in different beds between which pressure equalization is taking place, and likewise steps iii) and vi) taking place concurrently in different beds between which pressure equalization is taking place), it will be understood that steps ii) and vii) are of the same duration, and that steps iii) and vi) are of the same duration (hence if step ii) has a duration of, for example, 4 seconds then step vii) will likewise have a duration of 4 seconds).

As used herein in relation to a PSA cycle, a "co-current" step refers to a step in which gas flows into and/or out of the bed undergoing the step a direction that is the same as the direction of flow of gas during the feed step. Likewise, a "counter-current" step refers to a step in which gas flows into and/or out of the bed undergoing the step a direction that is the opposite direction to the direction of flow of gas during the feed step. Similarly, as used herein the "inlet" or "inlet" end of a bed refers to the inlet or end of the bed through which the feed gas enters during the feed step, and the "outlet" or "outlet" end of the bed refers to the outlet or end of the bed through which the product gas exits during the feed step.

A "dual" step indicates that gas is exiting the bed from both ends or entering the bed from both ends. Thus, in a dual re-pressurization step gas is entering the bed from both ends, and in a dual depressurization step gas is exiting the bed from both ends.

The feed step i) is typically performed at a temperature of about 0° F. to about 125° F., and more preferably at a temperature of about 20° F. to about 100° F. or about 20° F. to about 40° F. As used herein, the temperature at which the feed step is performed means the temperature of the feed gas being introduced into the adsorption bed, as measured at the inlet to the adsorption bed. Surprisingly, the present inventors have found that in the processes described and disclosed herein performing the feed step the process at a lower temperature (such as at about 30° F.) further increases the process productivity and product recovery, which is contrary to known PSA systems wherein reducing the temperature improves product recovery at the expense of reduced process productivity. Performing the feed step at such lower temperatures may be particularly beneficial where the feed gas is already available at a sub-ambient temperature (such as for example where the process is being used to separate oxygen and/or nitrogen from a crude argon stream obtained from a distillation column), such that significant cooling of the feed gas is not required in order to obtain a lower temperature feed gas stream for use in the feed step.

Any suitable feed pressure may be used during the feed step. For example, the pressure during the feed step, as measured at the inlet to the adsorption bed, may be from about 5 to about 12 atmospheres absolute.

The kinetically selective adsorbent(s) used in the processes according to the present invention preferably have an $O_2/N_2$ kinetic selectivity of at least 5 as determined by linear driving force model at 1 atma and 86° F., if the process is for separating $O_2$ from $N_2$. Similarly, the kinetically selective adsorbent(s) used in the processes according to the present invention preferably have an $O_2/Ar$ kinetic selectivity of at least 5 as determined by linear driving force model at 1 atma and 86° F., if the process is for separating $O_2$ from Ar. Determination of kinetic selectivity via the LDF model is as described above.

The adsorbent may be a material of any suitable type. Suitable adsorbents include carbon molecular sieves (CMS); and any small pore zeolite based kinetic adsorbent having rapid uptake rates, such as (but not limited to) an RS-10, RHO, or chabazite zeolites. It is known in the art how to produce adsorbents that have the required "fast" kinetic adsorbent properties.

For example, there are established methodologies for producing CMS adsorbents that show high kinetic selectivity for oxygen over nitrogen or oxygen over argon. To achieve this, selective micro-pores are introduced into the adsorbent, where the pore mouth diameter controls the adsorption kinetics of oxygen, nitrogen or argon, and is therefore considered to be the critical dimension for diffusion. Such micro-pores can exhibit very high selectivity, generally achieved at the expense of overall adsorption rates. On the other hand, the adsorption rates can be increased at the expense of selectivity. A suitable CMS adsorbent for use in the RCPSA process of the invention may for example have an $O_2/N_2$ kinetic selectivity of from 5 to 30, 10 to 25, or 15 to 20, and/or an $O_2/Ar$ kinetic selectivity of from 5 to 40. The CMS may have any suitable adsorption capacity. For example, it may have an adsorption capacity at equilibrium of between 0.2. to 0.4 mmol/g, as determined by standard isotherm measurement at 1 atma and 86° F.

A suitable zeolite for use in the RCPSA process of the invention may be a RHO zeolite having a Si/Al ratio of from 3.2 to 4.5 and containing non-proton extra-framework cations, wherein the zeolite contains at most 1 proton per unit cell, and wherein the size, number, and charge of the extra-framework cations that are present in the zeolite are such that 1 or fewer non-proton extra-framework cations per unit cell are required to occupy 8-ring sites. Such RHO zeolites are disclosed in US application numbers U.S. Ser. No. 15/718,467 and U.S. Ser. No. 15/718,620, filed on Sep. 28, 2017, the contents of which are hereby incorporated by reference in their entirety.

Suitable chabazite adsorbents are disclosed in U.S. Pat. Nos. 9,669,349 and 9,925,514, the contents of which are hereby incorporated by reference in their entirety.

The adsorbent beds may be packed with the adsorbent in any suitable form, but preferably comprise the adsorbent in the form of random packing. The adsorbent should preferably be dense loaded and held in place with a permeable hold down system, such as a perforated plate with wire mesh facing the CMS to contain it and downward pressure applied, such as by springs. The dense loading prevents additional settling which would unload the springs. Dense loading may be achieved by methods known in the art, such as snowfall-type loading.

Preferably, each adsorbent bed used in the process has a void volume relative to the total bed volume of about 3% to about 15%. Most preferably, each adsorbent bed used in the process has a void volume relative to the total bed volume of about 5% to about 13%, about 7% to about 12%, or about 10%. As used herein, the "void volume relative to the total bed volume" refers to the extra column void divided by the total volume of the bed.

The process may be performed using any suitable apparatus for carrying out RCPSA. Traditional switch valves will work up to a point. Preferably, however, the RCPSA process is a rotary bed RCPSA process carried out using a rotary bed PSA apparatus (where the adsorption beds are mounted in a rotor that is positioned between and rotates relative to feed and product stator assemblies each containing stator plates that function as valve plates for switching the beds between PSA steps of the cycle), or is a rotary valve RCPSA process carried out using a rotary valve PSA apparatus (where conversely the adsorption beds are located in a fixed bed assembly and are switched between PSA steps by rotary feed and product valves that are known in the art).

Figure 2:
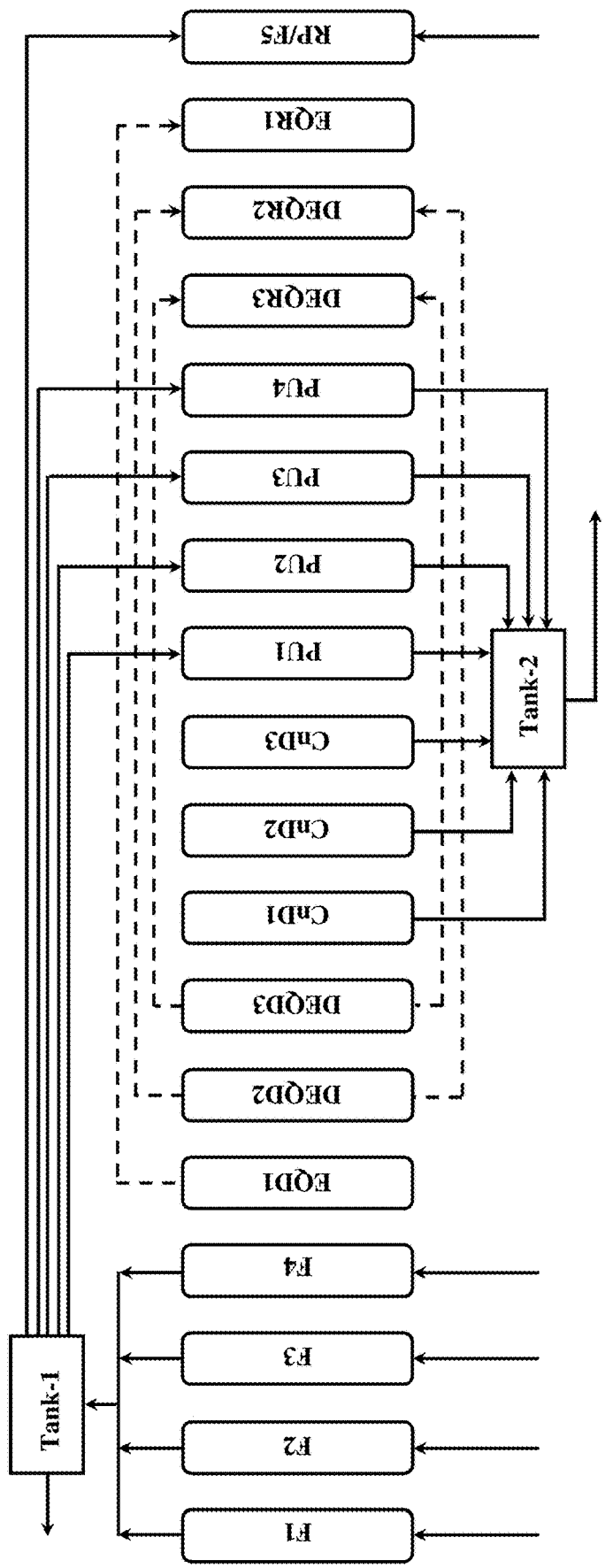
FIG. 2 shows the operation of a 9-bed multi-step PSA cycle.
Figure 3:
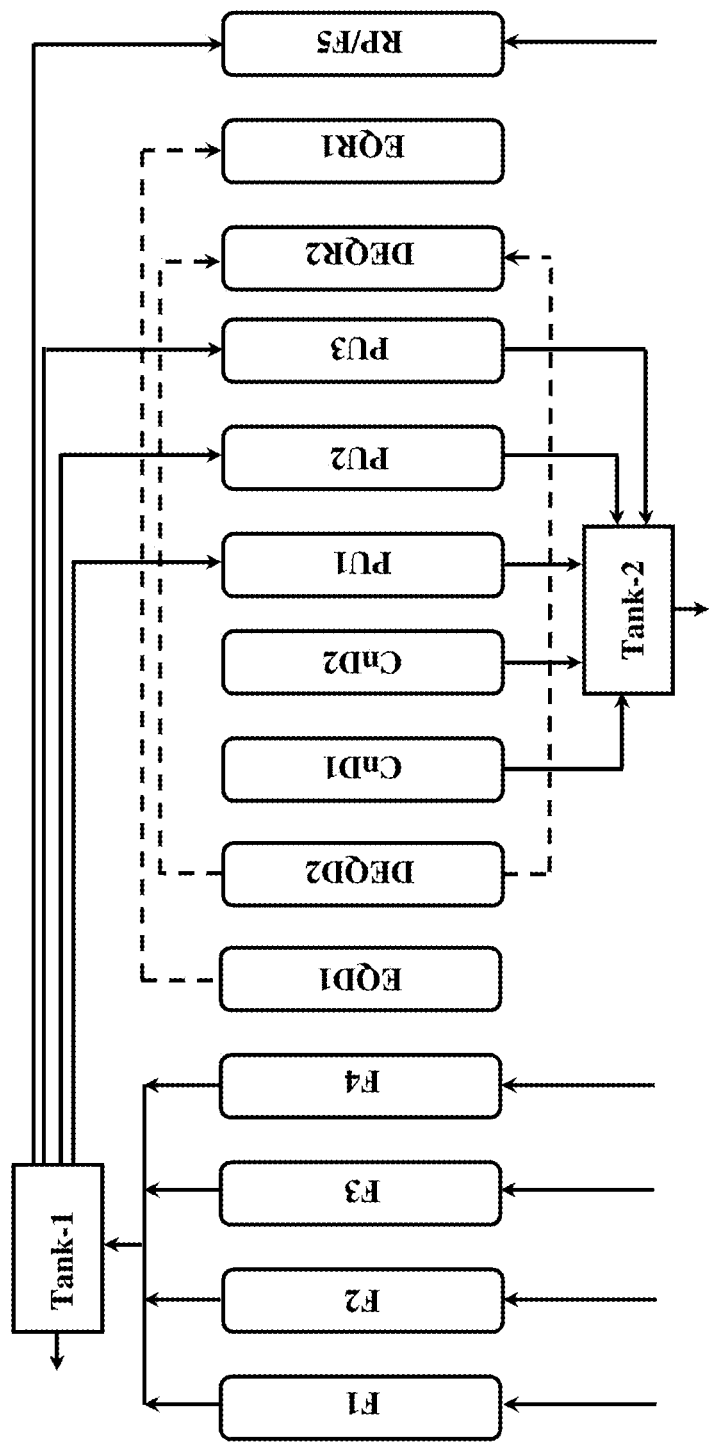
FIG. 3 shows the operation of a 7-bed multi-step PSA cycle.
Figure 4:
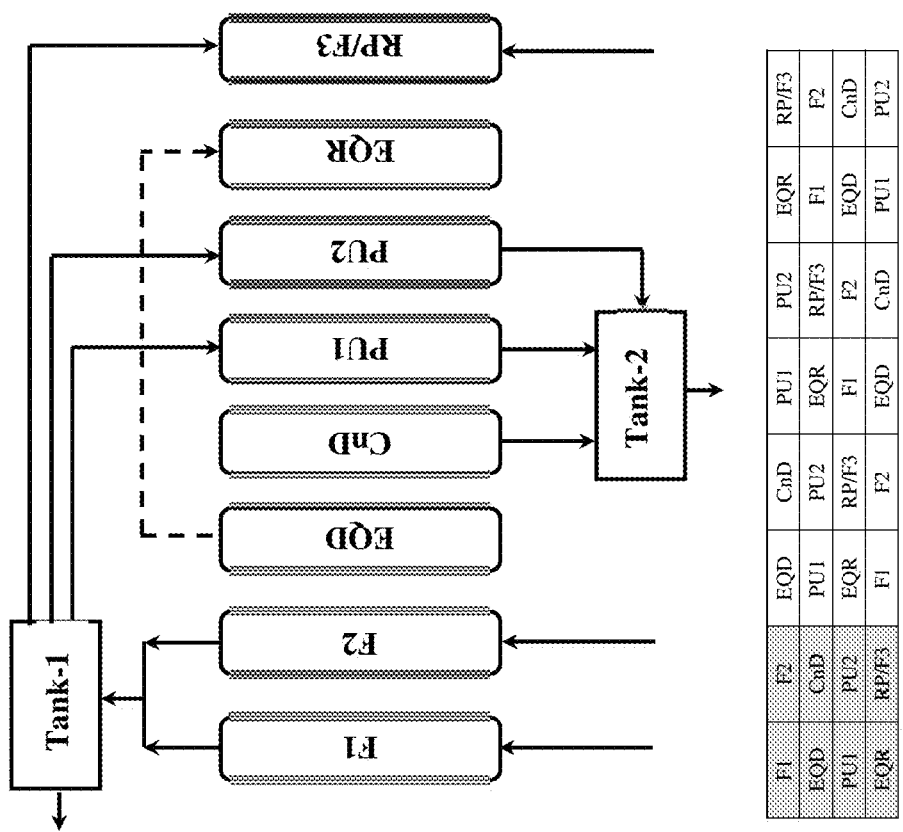
FIG. 4 shows the operation of a 4-bed multi-step PSA cycle.

Several multi-bed multi-step PSA cycles will now be described with reference to FIGS. 1 to 8, in which FIGS. 1 and 4 show comparative PSA cycles that are carried out in less than 5 beds and are not in accordance with the present invention, and FIGS. 2, 3, and 5-8 show exemplary PSA cycles employing 5 or more beds that are suitable for use in accordance with the present invention. In this regard, it should be noted that the term "adsorption bed" or "bed" as used herein refers to one or more vessels of adsorbent that are each undergoing each of the steps of the PSA cycle at the same time. Thus, a process that uses 2 beds has a first vessel or set of vessels that are all undergoing each step of the PSA cycle at the same time (this representing one of the beds), and has a second vessel or set of vessels that are all undergoing each step of the PSA cycle at the same time (this representing the other of the beds), the timing of the PSA cycle in the first vessel or set of vessels being however staggered from the timing of the PSA cycle in the second vessel or set of vessels such that each step of the PSA cycle in the first vessel or set of vessels does not start and finish at the same time as the start and finish of the corresponding step of the PSA cycle in the second vessel or set of vessels. The cycle schedules are incorporated in tabular format with all these designs. In these schedules, each row of the grid represents all the different cycle steps a given bed undergoes over the entire cycle, whereas a column of the grid represents which cycle step is being run by which bed at a particular unit time step. The total cycle time is the sum of all the individual unit time steps of a particular row. Note that in the cycle schedule, there is a highlighted section typically termed as "unit block" and within this block all the steps are being run by one of the multi-beds (Mehrotra et al., 2011). The number of repeated unit blocks is same as the number of beds. Typical cycle schedule formulation methodology can be found in the literature: "Mehrotra, A.; Ebner, A. D.; Ritter, J. A. Simplified Graphical Approach for Complex PSA Cycle Scheduling, *Adsorption*, 2011, 17 337-345". The salient features of all the cycle designs presented in FIGS. 1 to 8 are summarized below:

2-Bed Cycle (FIG. 1)

FIG. 1 shows a 2-bed PSA cycle, not in accordance with the present invention, that is included for comparative purposes. The cycle comprises a product and feed re-pressurization step (RP1/F1), a feed step (F2, F3), a co-current depressurization step (CoD), co-current and dual equalization depressurization steps (EQD1, DEQD2, DEQD3), a counter-current depressurization step (CnD1, CnD2), a product purge step (PU1, PU2), a product re-pressurization step (RP2, RP3), counter-current and dual equalization re-pressurization steps (EQR1, DEQR2, DEQR3) and various idle steps (I1, I2, I3). In the product and feed re-pressurization (F1/RP1) step, the bed is pressurized to the highest-pressure level of the cycle with the addition of primary product (e.g. enriched $N_2$) and feed gas (e.g. air) from top and bottom end of the bed, respectively. No product is withdrawn during this step of the cycle. Next, in the feed step (F2 and F3 representing phases of the same feed step) the introduction of feed gas is continued until the mass transfer zone of preferentially adsorbed component (i.e. $O_2$) reaches the exit end of the bed without substantially breaking through it, and the un-adsorbed gas (e.g. purified $N_2$) is discharged from the outlet end of bed as primary product. Then in the co-current depressurization step (CoD) the feed flow is stopped, and the bed pressure is reduced to first intermediate level through extracting product from top end of the bed. Then, in a co-current equalization depressurization step (EQD1) the bed is connected with a bed undergoing the counter-current equalization re-pressurization step (EQR1) and a portion of the void as well as desorbed gas is transferred from the product end of the bed undergoing EQD1 to the product end of the bed undergoing EQR1, thus partially equalizing pressure between the two beds and lowering the bed pressure in the bed undergoing EQD1 to second intermediate level at the end of this step. Next, in the dual end equalization de-pressurization step (DEQD2) more co-adsorbed gas as well as void gases are withdrawn from top and bottom of the first bed undergoing said step, bringing the pressure in said bed down to a third intermediate level, the gases withdrawn from the top and bottom of the bed being set to respectively the top and bottom of the bed undergoing the dual equalization re-pressurization step (DEQR2). Next, the dual end equalization de-pressurization is continued in step (DEQD3/CnD1) but with some of the counter-currently withdrawn depressurization step being taken as secondary product (i.e. an $O_2$ enriched gas) rather than being used to re-pressurize another bed, this further reducing the pressure of the bed to a fourth intermediate level. The bed is then counter-currently de-pressurized down to the lowest operating pressure in a counter-current depressurization step (CnD2) and purged at the lowest operating pressure of the cycle in a purge step (PU1 and PU2), producing further secondary product. Thereafter, the bed is re-pressurized counter-currently with primary product gas in a counter-current re-pressurization step (RP2 and RP3). Following the re-pressurization step (RP2 and RP3), the column is further pressurized through pressure equalization re-pressurization steps (EQR1, DEQR2, and DEQR3) to bring back the pressure level for initiation and repetition of the cycle. Note that three idle steps (I1, I2, and I3) are incorporated into the cycle schedule, during which the bed undergoing the idle step is isolated, the valves leading to it being in the closed position.

Although listed above as being three separate equalization depressurization steps and three separate equalization re-pressurization steps, it should be noted that all three equalization depressurization (EQD1, DEQD2, DEQD3) and equalization re-pressurization (EQR1, DEQR2, DEQR3) steps in this cycle take place between the same two beds (this being inevitable since the cycle is a 2-bed cycle and thus only two beds are present). In the context of the present application this process therefore has only one "true" equalization depressurization step and one "true" equalization re-pressurization, with steps EQD1, DEQD2, DEQD3 representing phases of the same pressure equalization depressurization step and steps EQR1, DEQR2, DEQR3 representing phases of the same equalization re-pressurization step.

9-Bed Cycle (FIG. 2)

FIG. 2 shows a 9-bed PSA process suitable for use in accordance with one embodiment of the present invention. This process comprises feed (F1 to F4), co-current equalization depressurization 1 (EQD1), dual equalization depressurization 2 (DEQD2), dual equalization depressurization 3 (DEQD3), counter-current depressurization (CnD1 to CnD3), counter-current product purge (PU1 to PU4), dual equalization re-pressurization 3 (DEQR3), dual equalization re-pressurization 2 (DEQR2), counter-current equalization re-pressurization 1 (EQR1) and product & feed re-pressurization (RP/F5) steps. Each step is described in detail below.

i) Feed step (F1 to F4): Assuming that the bed has been previously pressurized to the highest-pressure level of the cycle, the feed gas mixture is introduced to the inlet end of bed and the un-adsorbed gas is discharged from the outlet end of bed. The feed step is continued until the mass transfer zone (MTZ) of preferentially adsorbed component reaches exit end of the bed without substantially breaking through it.

ii) Co-current equalization depressurization 1 (EQD1): At termination of the feed step, the bed is connected with another bed in the EQR1 step (described below). A portion of the void as well as desorbed gas is transferred from the product (exit) end of the bed in EQD1 to the product (exit) end of another bed in EQR1, thus lowering the bed pressure in EQD1 to first intermediate level.

iii) Dual equalization depressurization 2 (DEQD2): Following EQD1, the bed is depressurized to second intermediate pressure level by connecting it with another bed in the DEQR2 step (described below). The effluent containing void as well as desorbed gases is transferred from the bed in DEQD2 into another bed in DEQR2 through feed (inlet) and product (exit) ends.

iv) Dual equalization depressurization 3 (DEQD3): Following DEQD2, the pressure in the bed is further lowered to third intermediate level by transferring void and desorbed gases to another bed in the DEQR3 step (described below). The pressure transfer again is conducted through feed (inlet) as well as product (exit) ends of the bed.

v) Counter-current depressurization (CnD1 to CnD3): Following DEQD3, the bed is depressurized through the feed (inlet) end counter-currently to or near ambient pressure level. The effluent containing more selectively adsorbed species is withdrawn as a secondary product.

vi) Counter-current product purge (PU1 to PU4): Upon termination of the counter-current depressurization step, the purge gas is introduced to the product (exit) end of the bed, and the effluent is collected as secondary product from feed (inlet) end of the bed.

vii) Dual equalization re-pressurization 3 (DEQR3): Following the purge step, the bed pressure is brought back up to a third intermediate level (as described with DEQD3 step) from atmospheric pressure by introducing the void as well as desorbed gases from another bed undergoing DEQD3. Note that the gas is transferred through both ends of the column.

viii) Dual equalization re-pressurization 2 (DEQR2): Following DEQR3, the bed pressure is brought back up to a second intermediate level (as described with DEQD2 step) by introducing the void as well as desorbed gases from another bed undergoing DEQD2. This is again a dual end pressure transfer step.

ix) Counter-current equalization re-pressurization 1 (EQR1): Following DEQR2, the bed pressure is brought back to a first intermediate level (as described with EQD1 step) by introducing the void as well as desorbed gases from another bed undergoing EQD1. Notice that the gas is transferred through the product (exit) end of the column.

x) Product & feed re-pressurization (RP/F5): Finally, the bed pressure is brought back to the feed or highest-pressure level of the cycle for initiation and the cycle is repeated. This step is initiated through introducing feed and part of the primary product gas from the feed (inlet) and product (exit) ends, respectively.

In this process cycle two beds are continuously fed, therefore the product withdrawal is continuous. Flow fluctuation in feed and product streams can be reduced/eliminated due to the multi-bed nature of this process. During last phase of pressure equalization, nearly pure void gas containing mostly primary product is used to pressurize the bed during step EQR1. Therefore, the pressure equalization is more efficient than the conventional 2-bed kinetic PSA process cycle presented in FIG. 1.

7-Bed Cycle (FIG. 3)

FIG. 3 shows a 7-bed PSA process suitable for use in accordance with another embodiment of the present invention. This process comprises feed (F1 to F4), co-current equalization depressurization 1 (EQD1), dual equalization depressurization 2 (DEQD2), counter-current depressurization (CnD1 and CnD2), counter-current product purge (PU1 to PU3), dual equalization re-pressurization 2 (DEQR2), counter-current equalization re-pressurization 1 (EQR1) and product & feed re-pressurization (RP/F5) steps. Each step is described in detail below.

i) Feed step (F1 to F4): Assuming that the bed has been previously pressurized to the highest-pressure level of the cycle, the feed gas mixture is introduced to the inlet end of bed and the un-adsorbed gas is discharged from the outlet end of bed. The feed step is continued until the mass transfer zone (MTZ) of preferentially adsorbed component reaches exit end of the bed without substantially breaking through it.

ii) Co-current equalization depressurization 1 (EQD1): At termination of the feed step, the bed is connected with another bed undergoing step EQR1 (described below). A portion of the void as well as desorbed gas is transferred from the product (exit) end of the bed in the EQD1 step to the product (exit) end of another bed in the EQR1 step, thus lowering the bed pressure in EQD1 to a first intermediate level.

iii) Dual equalization depressurization 2 (DEQD2): Following EQD1, the bed is depressurized to a second intermediate pressure level by connecting it with other bed undergoing step DEQR2 (described below). The effluent containing void as well as desorbed gases is transferred from the bed in DEQD2 into another bed in DEQR2 through feed (inlet) and product (exit) ends.

iv) Counter-current depressurization (CnD1 and CnD2): Following DEQD2, the bed is depressurized through the feed (inlet) end counter-currently to or near ambient pressure level. The effluent containing more selectively adsorbed species is withdrawn as a secondary product.

v) Counter-current product purge (PU1 to PU3): Upon termination of the counter-current depressurization step, the purge gas is introduced to the product (exit) end of the bed and the effluent is collected as secondary product from feed (inlet) end of the bed.

vi) Dual equalization re-pressurization 2 (DEQR2): Following the purge step, the bed pressure is brought back up to a second intermediate level (as described with DEQD2 step) by introducing the void as well as desorbed gases from another bed undergoing DEQD2. This is again a dual end pressure transfer mode.

vii) Counter-current equalization re-pressurization 1 (EQR1): Following DEQR2, the bed pressure is brought back to a first intermediate level (as described with EQD1 step) by introducing the void as well as desorbed gases from another bed undergoing EQD1. Notice that the gas is transferred through the product (exit) end of the column.

viii) Product & feed re-pressurization (RP/F5): Finally, the bed pressure is brought back to the feed or highest-pressure level of the cycle for initiation and cycle is repeated. This step is initiated through introducing feed gas and part of the primary product gas from feed (inlet) and product (exit) ends, respectively.

In this process cycle two beds are continuously fed, therefore the product withdrawal is continuous. Flow fluctuation in feed and product streams can be reduced/eliminated due to the multi-bed nature of this process. During last phase of pressure equalization, nearly pure void gas containing mostly primary product is used to pressurize the bed during step EQR1. Therefore, the pressure equalization is more efficient than the conventional 2-bed kinetic PSA process cycle presented in FIG. 1.

4-Bed Cycle (FIG. 4)

FIG. 4 shows a 4-bed PSA process, not in accordance with the present invention, that is included for comparative purposes. The process comprises feed (F1 and F2), co-current equalization depressurization (EQD), counter-current depressurization (CnD), counter-current product purge (PU1 and PU2), counter-current equalization re-pressurization (EQR), and product & feed re-pressurization (RP/F3) steps. Each step is described in detail below.

i) Feed step (F1 and F2): Assuming that the bed has been previously pressurized to the highest-pressure level of the cycle, the feed gas mixture is introduced to the inlet end of bed and the un-adsorbed gas is discharged from the outlet end of bed. The feed step is continued until the mass transfer zone (MTZ) of preferentially adsorbed component reaches the exit end of the bed without substantially breaking through it.

ii) Co-current equalization depressurization (EQD): At termination of the feed step, the bed is connected with another bed undergoing step EQR (described below). A portion of the void as well as desorbed gas is transferred from the product (exit) end of the bed in EQD to the product (exit) end of another bed in EQR, thus lowering the bed pressure in EQD to an intermediate level.

iii) Counter-current depressurization (CnD): Following EQR, the bed is depressurized through the feed (inlet) end counter-currently to or near ambient pressure level. The effluent containing more selectively adsorbed species is withdrawn as a secondary product.

iv) Counter-current product purge (PU1 and PU2): Upon termination of the counter-current depressurization step, the purge gas is introduced to the product (exit) end of the bed and the effluent is collected as secondary product from feed (inlet) end of the bed.

v) Counter-current equalization re-pressurization (EQR): Following the purge step, the bed pressure is brought back to an intermediate level (as described with EQD step) by introducing the void as well as desorbed gases from another bed undergoing EQD. Notice that the gas is transferred through the product (exit) end of the bed.

vi) Product & feed re-pressurization (RP/F3): Finally, the bed pressure is brought back to the feed or highest-pressure level of the cycle for initiation and repetition of the aforementioned steps. This step is initiated through introducing feed gas as well as part of the primary product gas from feed (inlet) and product (exit) ends, respectively.

Figure 5:
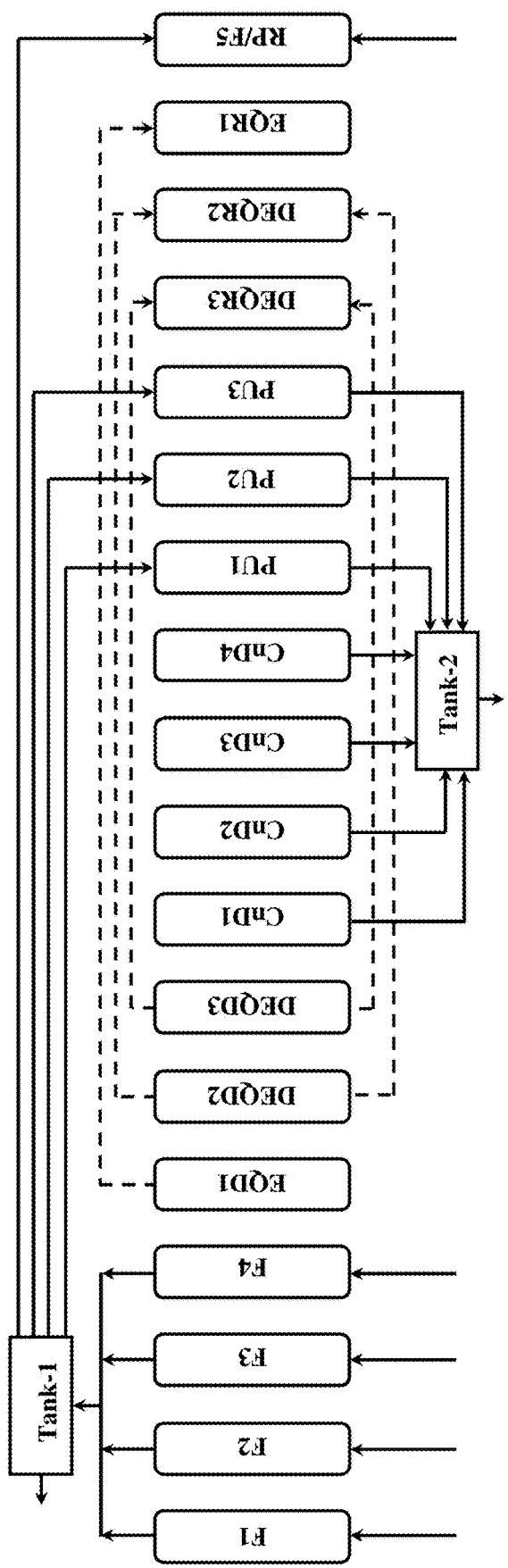
FIG. 5 shows the operation of an 18-bed multi-step PSA cycle.

18-Bed Cycle (FIG. 5)

FIG. 5 shows an 18-bed PSA process suitable for use in accordance with another embodiment of the present invention. This process comprises feed (F1 to F4), co-current equalization depressurization 1 (EQD1), dual equalization depressurization 2 (DEQD2), dual equalization depressurization 3 (DEQD3), counter-current depressurization (CnD1 to CnD4), counter-current product purge (PU1 to PU3), dual equalization re-pressurization 3 (DEQR3), dual equalization re-pressurization 2 (DEQR2), counter-current equalization re-pressurization 1 (EQR1) and product & feed re-pressurization (RP/F5) steps. Each step is described in detail below.

i) Feed step (F1 to F4): Assuming that the bed has been previously pressurized to the highest-pressure level of the cycle, the feed gas mixture is introduced to the inlet end of bed and the un-adsorbed gas is discharged from the outlet end of bed. The feed step is continued until the mass transfer zone (MTZ) of preferentially adsorbed component reaches exit end of the bed without substantially breaking through it.

ii) Co-current equalization depressurization 1 (EQD1): At termination of the feed step, the bed is connected with another bed in the EQR1 step (described below). A portion of the void as well as desorbed gas is transferred from the product (exit) end of the bed in EQD1 to the product (exit) end of another bed in EQR1, thus lowering the bed pressure in EQD1 to first intermediate level.

iii) Dual equalization depressurization 2 (DEQD2): Following EQD1, the bed is depressurized to second intermediate pressure level by connecting it with another bed in the DEQR2 step (described below). The effluent containing void as well as desorbed gases is transferred from the bed in DEQD2 into another bed in DEQR2 through feed (inlet) and product (exit) ends.

iv) Dual equalization depressurization 3 (DEQD3): Following DEQD2, the pressure in the bed is further lowered to third intermediate level by transferring void and desorbed gases to another bed in the DEQR3 step (described below). The pressure transfer again is conducted through feed (inlet) as well as product (exit) ends of the bed.

v) Counter-current depressurization (CnD1 to CnD4): Following DEQD3, the bed is depressurized through the feed (inlet) end counter-currently to or near ambient pressure level. The effluent containing more selectively adsorbed species is withdrawn as a secondary product.

vi) Counter-current product purge (PU1 to PU3): Upon termination of the counter-current depressurization step, the purge gas is introduced to the product (exit) end of the bed, and the effluent is collected as secondary product from feed (inlet) end of the bed.

vii) Dual equalization re-pressurization 3 (DEQR3): Following the purge step, the bed pressure is brought back to third intermediate level (as described with DEQD3 step) from atmospheric pressure by introducing the void as well as desorbed gases from another bed undergoing DEQD3. Note that the gas is transferred through both ends of the column.

viii) Dual equalization re-pressurization 2 (DEQR2): Following DEQR3, the bed pressure is brought back to a second intermediate level (as described with DEQD2 step) by introducing the void as well as desorbed gases from another bed undergoing DEQD2. This is again a dual end pressure transfer step.

ix) Counter-current equalization re-pressurization 1 (EQR1): Following DEQR2, the bed pressure is brought back to a first intermediate level (as described with EQD1 step) by introducing the void as well as desorbed gases from another bed undergoing EQD1. Notice that the gas is transferred through the product (exit) end of the column.

x) Product & feed re-pressurization (RP/F5): Finally, the bed pressure is brought back to the feed or highest-pressure level of the cycle for initiation and the cycle is repeated. This step is initiated through introducing feed and part of the primary product gas from the feed (inlet) and product (exit) ends, respectively.

In this process cycle, seven beds are continuously fed, therefore the product withdrawal is continuous. Flow fluctuation in feed and product streams can be reduced/eliminated due to the multi-bed nature of the process. During last phase of pressure equalization, nearly pure void gas containing mostly primary product is used to pressurize the bed during step EQR1. Therefore, the pressure equalization is more efficient than the conventional 2-bed kinetic PSA process cycle presented in FIG. 1. Note that due to space limitation, only one "unit block" is shown in the cycle schedule. The remaining blocks can be filled by following the approach described in the literature (Mehrotra et al., 2011).

Figure 6:
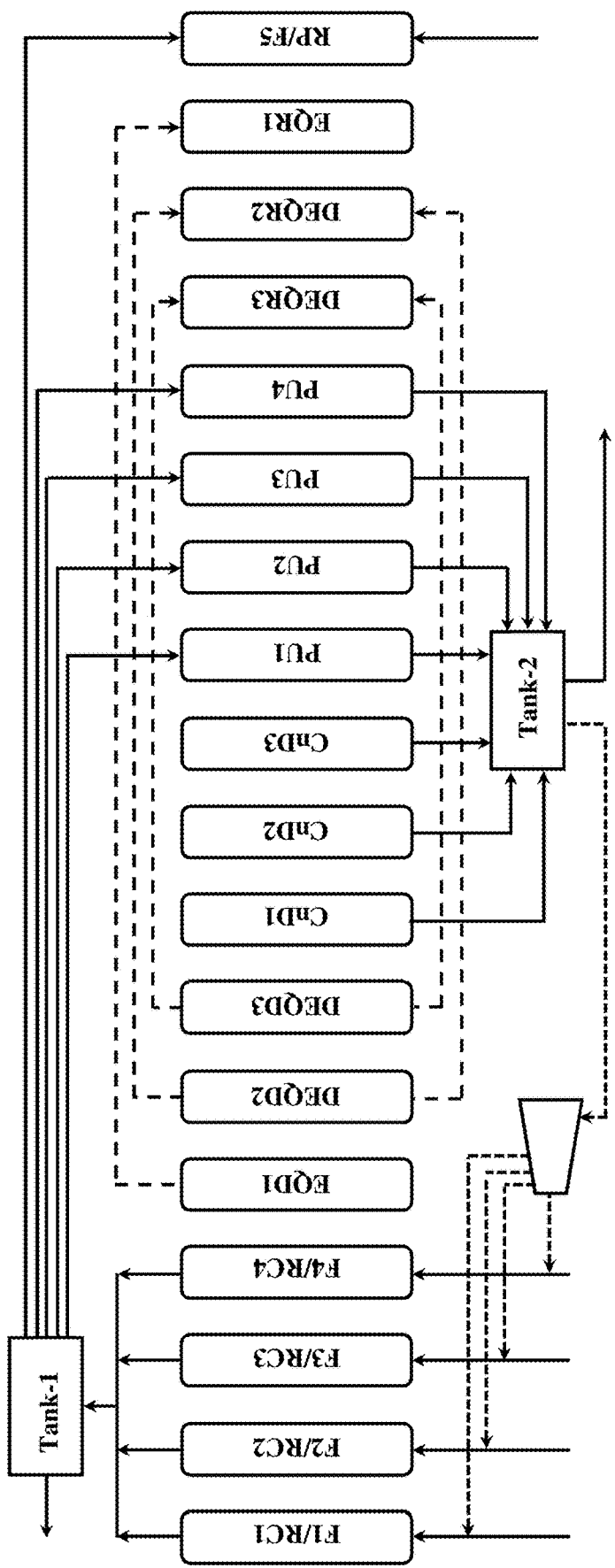
FIG. 6 shows the operation of a 9-bed multi-step PSA cycle with vent gas recycle to the PSA feed step.

9-Bed Cycle (FIG. 6)

FIG. 6 shows a 9-bed PSA process with an added recycle step suitable for use in accordance with another embodiment of the present invention. All of the features as described for the 9-bed 18-step cycle as presented in FIG. 2 are applicable for this embodiment. The only exception is that a recycle scheme is introduced with this cycle. The recycle gas is taken from the secondary product gas produced during the counter-current depressurization (CnD1 to CnD3) and product purge (PU1 to PU4) steps. The recycle gas is then mixed with the fresh feed. As the vent gas is at or near atmospheric pressure, the recycle gas can be pressurized (up to feed pressure level) separately and thereafter mixed with the fresh feed (shown in the FIG. 6) or the low-pressure vent gas can be mixed with fresh feed and then combined steam can be pressurized (not shown) and sent as a feed to the bed. A separate recycle compressor is required if the vent gas is pressurized separately or a bigger compressor is needed for combined pressurization option. This cycle is designed to boost recovery of the primary product gas.

Figure 7:
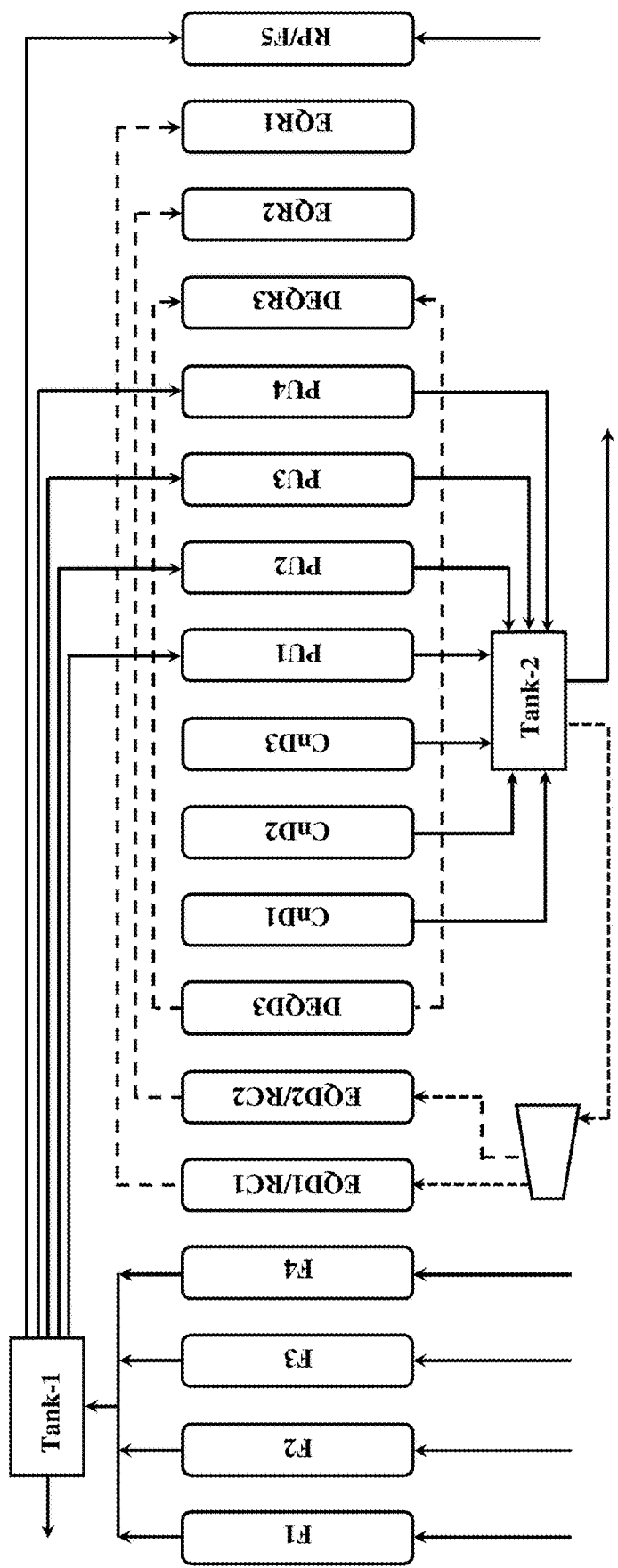
FIG. 7 shows the operation of a 9-bed multi-step PSA cycle with vent gas recycle to a PSA equalization step.

9-Bed Cycle (FIG. 7)

FIG. 7 shows another 9-bed PSA process with an added recycle step suitable for use in accordance with another embodiment of the present invention. Again, the inclusion of the recycle step is to boost recovery of the primary product gas. The features described for the 9-bed 18-step cycle presented in FIG. 2 are applicable in this embodiment, with the following exceptions:

i) A recycle stream is added at the feed (inlet) end of the bed undergoing the co-current equalization depressurization step EQD1. The recycle stream is the secondary product gas produced during counter-current depressurization (CnD1 to CnD3) and product purge (PU1 to PU4) steps that has been pressurized by a recycle compressor. The gas emanating from the EQD1/RC1 step from the product (exit) end of the bed is used to re-pressurize another bed undergoing equalization re-pressurization (EQR1) step through the product (exit) end of the bed as shown in FIG. 7. A separate recycle compressor is required for this option.

ii) The dual equalization depressurization 2 (DEQD2) step is converted to a co-current, single end equalization depressurization step EQD2 and a recycle stream is introduced at the feed (inlet) end of the bed. The recycle stream is the secondary product gas produced during counter-current depressurization (CnD1 to CnD3) and product purge (PU1 to PU4) steps that has been pressurized by a recycle compressor. The gas emanating from the EQD2/RC2 step (as shown in FIG. 7) from the product (exit) end of the bed is used to re-pressurize another bed undergoing counter-current equalization re-pressurization step EQR2 through the product (exit) end of the bed. As noted previously, a separate recycle compressor is required for this.

Figure 8:
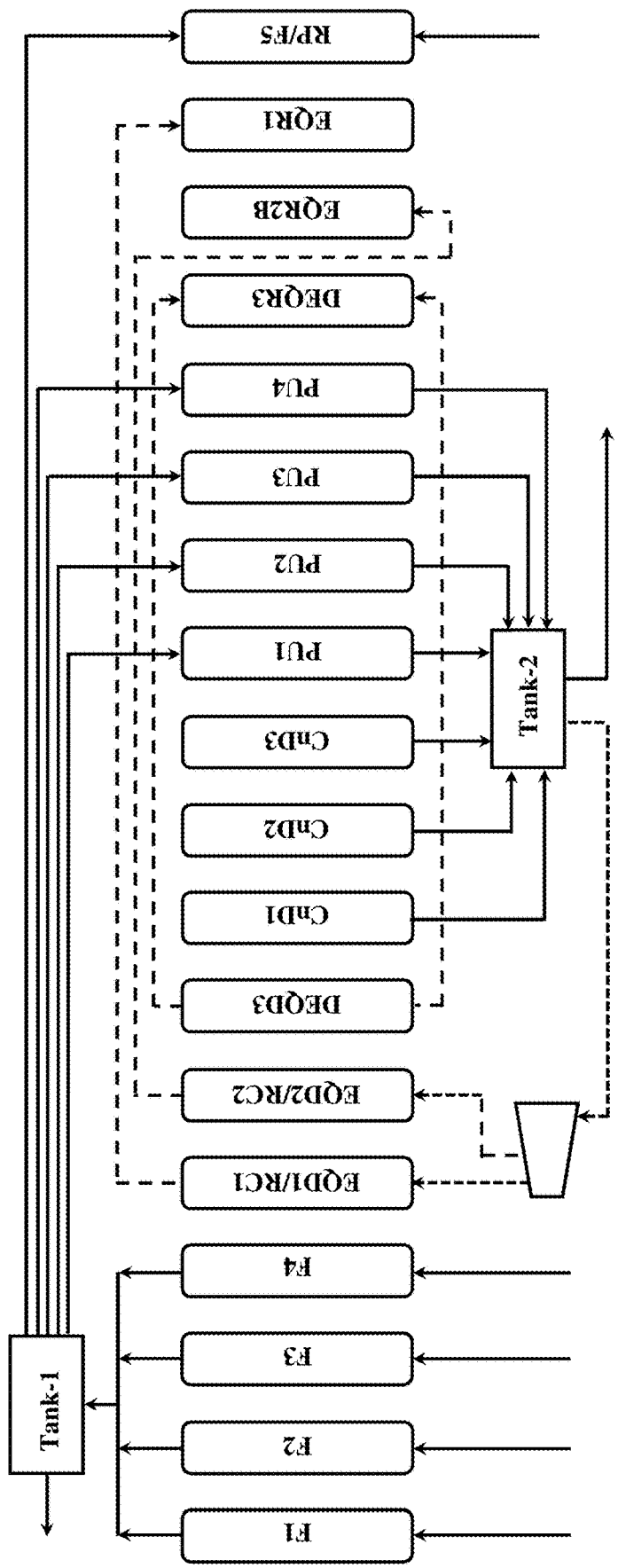
FIG. 8 shows the operation of a 9-bed multi-step PSA cycle with vent gas recycle to a PSA equalization step.

9-Bed Cycle (FIG. 8)

FIG. 8 shows another 9-bed PSA process with an added recycle step suitable for use in accordance with another embodiment of the present invention and is a modification of the 9-bed cycle shown in FIG. 7. The only difference from FIG. 7 is that in this process the gas emanating from the EQD2/RC2 step from the product (exit) end of the bed is used to re-pressurize another bed undergoing co-current equalization re-pressurization step (EQR2B) through the feed (inlet) end of the bed as shown in FIG. 8.

EXAMPLES

The 2-bed multi-step (shown in FIG. 1) and 9-bed multi-step (shown in FIG. 2) pressure swing adsorption (PSA) process cycles were used to evaluate process performance indicators in terms of feed to product ratio and specific productivity for separating nitrogen from air using several carbon molecular sieve (CMS) adsorbents. A summary of oxygen, nitrogen and argon adsorption rates as well as kinetic selectivity of oxygen over nitrogen for each of the CMS adsorbents is presented in Table 1. Note that the oxygen over nitrogen kinetic selectivity on 414-01 ("slow") and 414-02 ("fast") CMS adsorbents are same but the oxygen rate on 414-02 CMS adsorbent is 2× faster than the 414-01 CMS adsorbent. On the other hand, the oxygen rates on 414-02 and 414-03 ("fast") CMS adsorbents are same but the kinetic selectivity (oxygen over nitrogen) on 414-02 CMS adsorbent is 2× higher than the one on the 414-03 adsorbent. The bed geometry, operating conditions and product oxygen concentration are likewise summarized in Table 1. Note also that the feed to product ratio is inverse of recovery, therefore, the lower the ratio, the better the recovery and vice versa. In other words, lower feed to product ratio means lower power requirement for the compressor.

The 2-bed and 9-bed PSA process performances on the above CMS adsorbents are summarized in FIGS. 9 (9a to 9f). The conclusions for the evaluation are summarized below.

When the "slow" CMS adsorbent (414-01) is used, no improvement in process performance is observed when changing from the 2-bed to the 9-bed multi-step RCPSA process. For example, with the 9-bed process using 414-01 CMS adsorbent, the maximum productivity is 146.98 scfh60F/ft$^3$ at 40 s cycle time as can be seen from FIG. 9a and the corresponding feed to product ratio is 2.53 (as can be seen from FIG. 9b). On the other hand, for 2-bed multi-step process the maximum productivity and corresponding feed to product ratio are 151.38 scfh60F/ft$^3$ and 2.30, respectively where the cycle time is 100 s (as can be seen from FIGS. 9a and 9b). For both of these processes, the PSA process performance is evaluated for nitrogen product containing 4500 ppm oxygen at a temperature of 100° F. and a bed pressure of 7.80 atma.

Figure 9A:
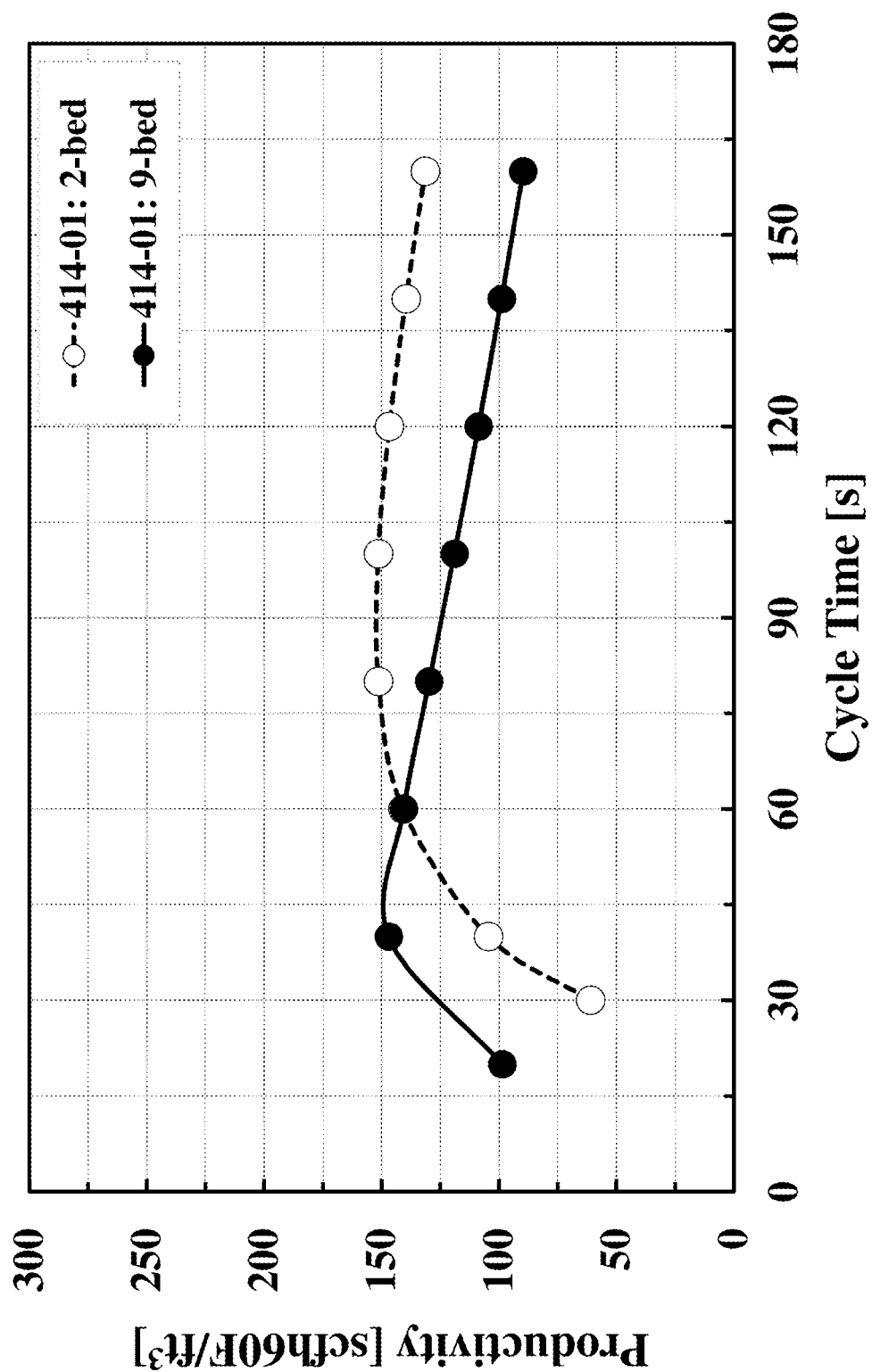
FIGS. 9a, 9b, 9c, 9d, 9e, and 9f are graphs showing comparison of process performance (in terms of "productivity" and "feed to product ratio" as function of cycle time) of the 2-bed (cycle presented in FIG. 1) and 9-bed (cycle presented in FIG. 2) multi-step PSA cycles using different carbon molecular sieve adsorbents (414-01, 414-02 and 414-03 adsorbents) for producing nitrogen from air.
Figure 9B:
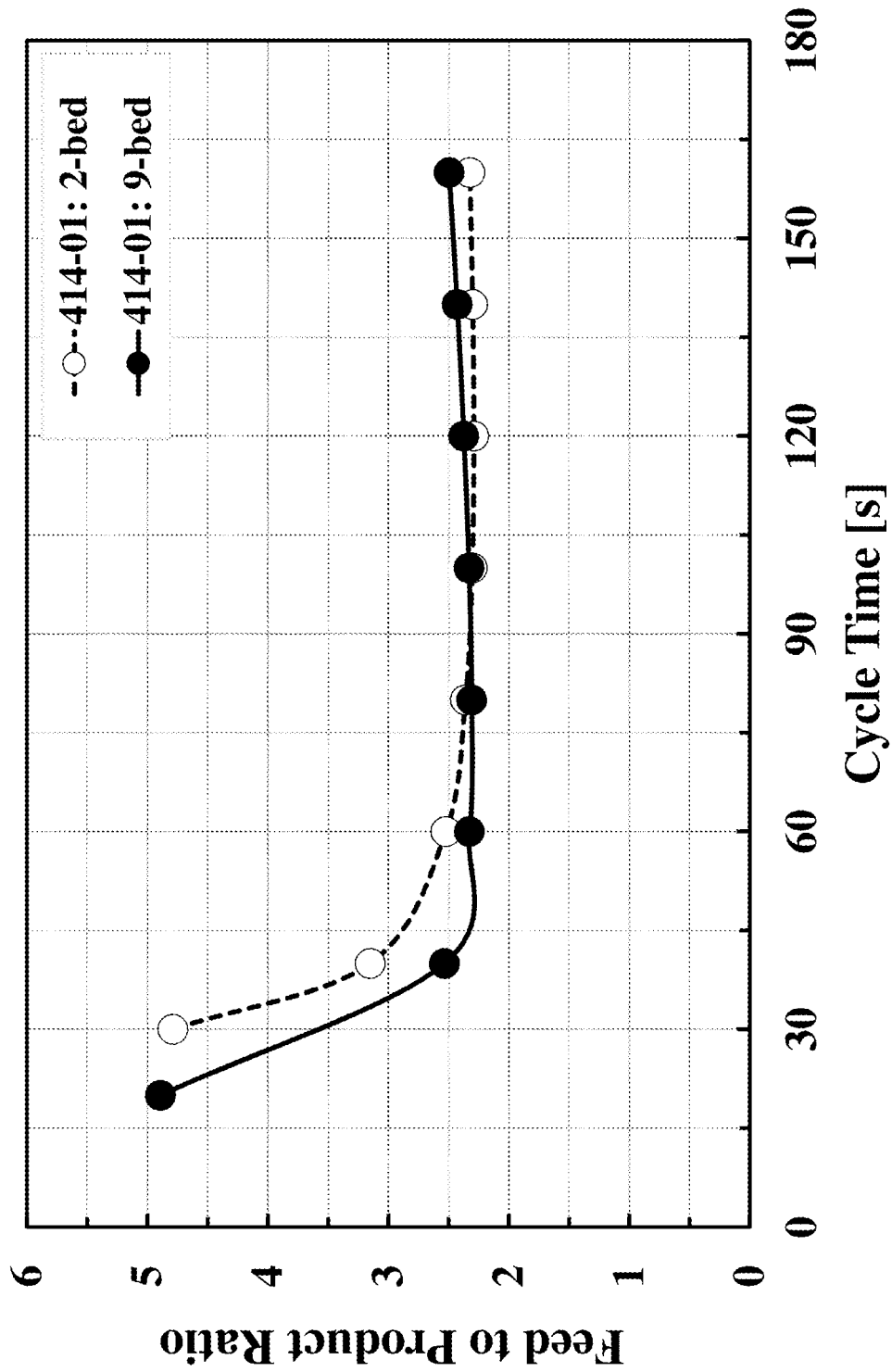
Figure 9C:
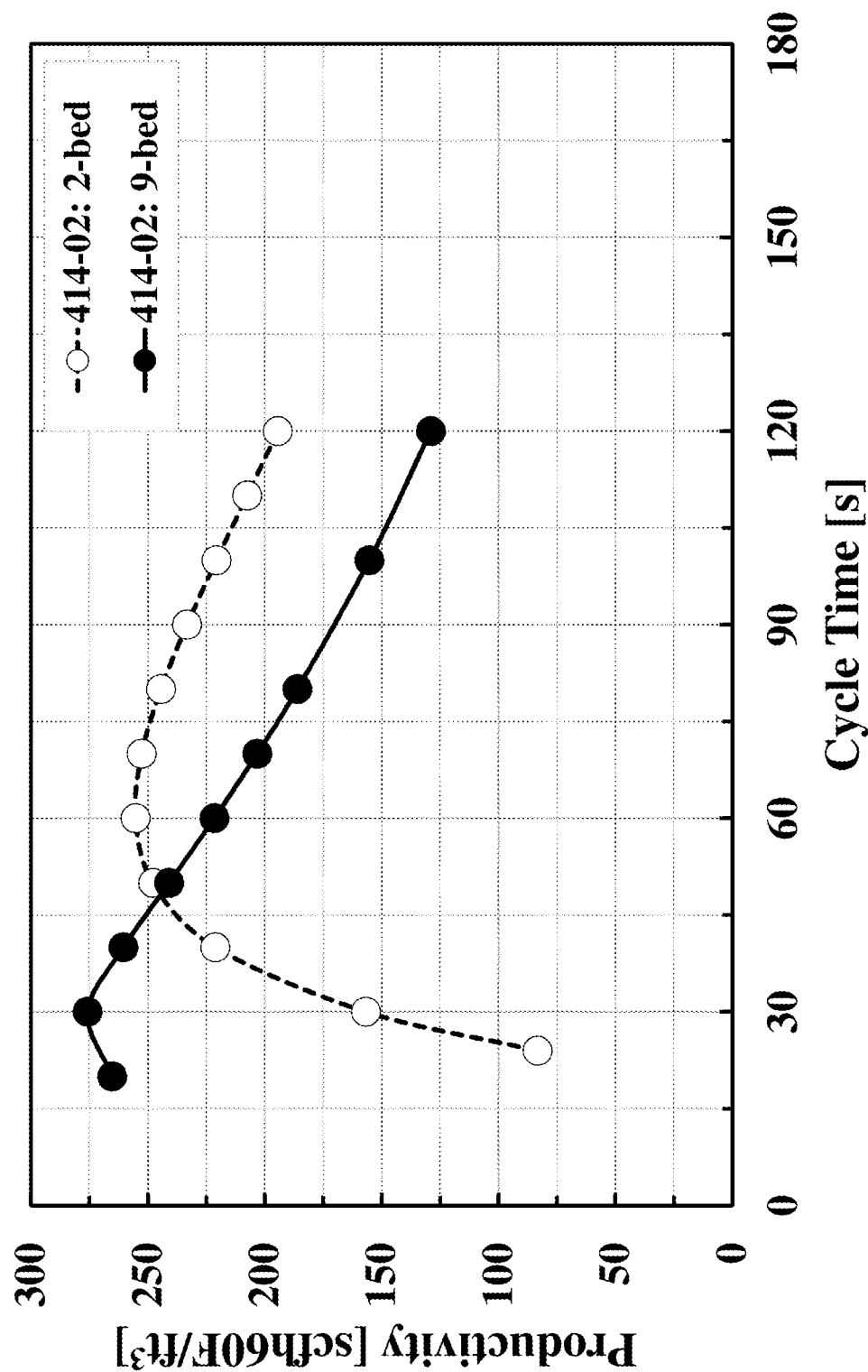
Figure 9D:
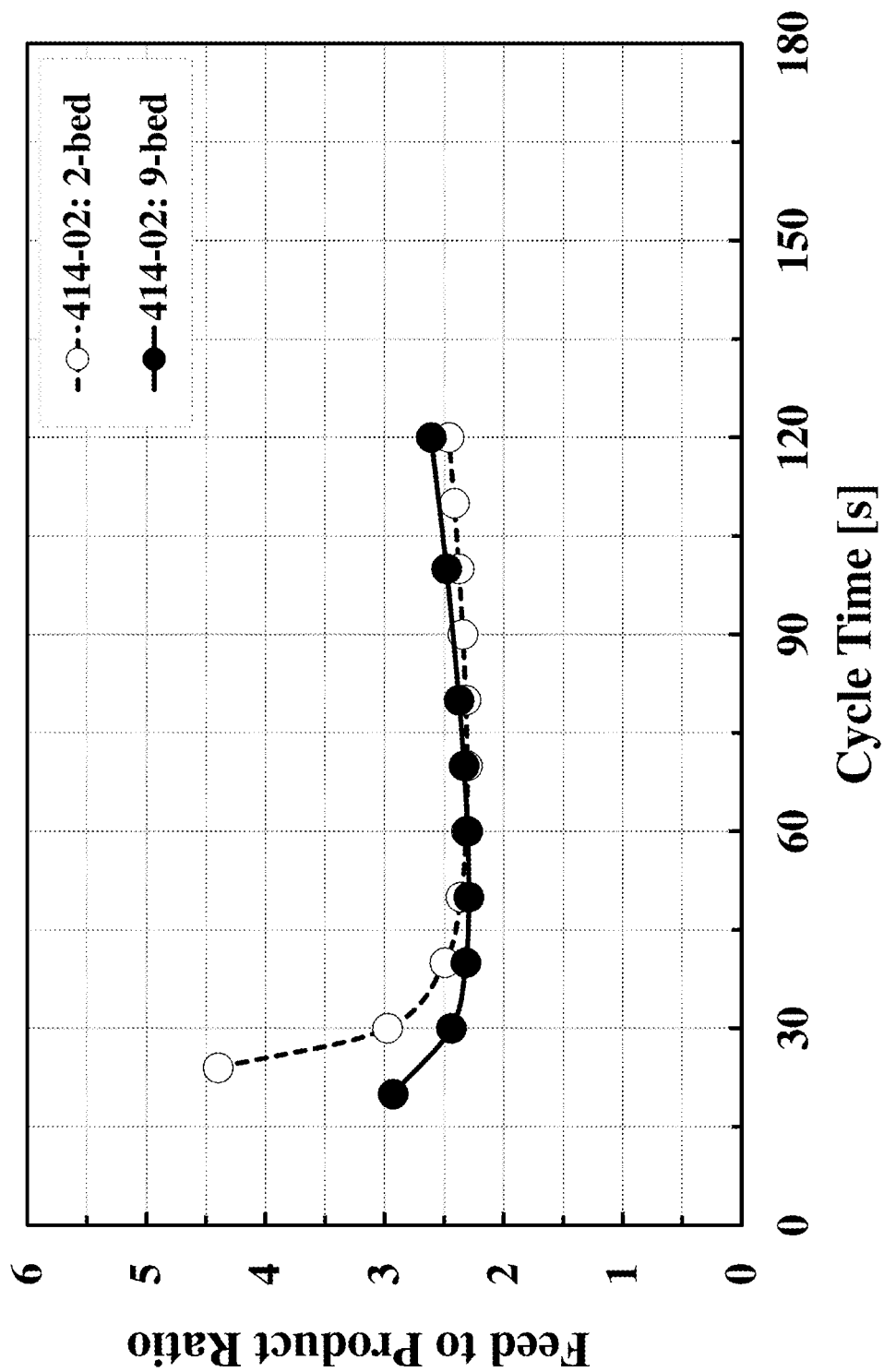

Comparison of the 2-bed and 9-bed multi-step process performances using a "fast" CMS adsorbent (414-02) with similar kinetic selectivity to the "slow" (414-01) CMS are summarized in FIGS. 9c and 9d. Again, the process performance is evaluated for nitrogen product containing 4500 ppm oxygen at a temperature of 100° F. and a bed pressure of 7.80 atma. The bed geometry and other parameters are summarized in Table 1.

FIGS. 9c and 9d clearly show that the faster rate CMS adsorbent (414-02 CMS) when coupled with a multi-bed multi-step process vastly outperforms the slower rate CMS (414-01 CMS) even though the kinetic selectivity (oxygen over nitrogen in this case) for both CMS adsorbents are similar (as can be seen from Table 1). As noted above, the 414-01 CMS performs acceptably when coupled with 2-bed multi-step process (i.e. no benefit is obtained by changing to a 9 bed process). As such, the performances from the 2-bed process utilizing slow 414-01 CMS adsorbent are used to compare the 9-bed process performance utilizing the fast 414-02 CMS. For example, the productivity and feed to product ratio at 100 s cycle time are 151.38 scfh60F/ft$^3$ and 2.30, respectively, with the 2-bed process using the 414-01 CMS. With 9-bed multi-step process using the 414-02 CMS adsorbent, the productivity and feed to product ratio are 240.92 scfh60F/ft$^3$ and 2.29, respectively at 50 s cycle time. This means at least 59% improvement in specific productivity can be achieved at similar feed to product ratio (or recovery) when faster CMS adsorbent is coupled with the multi-bed process.

The 9-bed multi-step RCPSA process also maintains high specific productivity versus a 2-bed process, with comparable product recovery. As can be seen from FIG. 9c, the specific productivity for 9-bed process using the fast CMS increases from 240.92 to 265.35 scfh60F/ft$^3$ when the cycle time is reduced from 50 to 20 s. During this time period, the feed to product ratio only moderately increases from 2.29 to 2.93 (see FIG. 9d). The 2-bed process using the faster CMS adsorbent (414-02) outperforms the "slow" CMS (414-01) 2-bed process, but demonstrates a lower specific productivity and recovery vs the 9-bed process when operated at faster cycle time (20 seconds vs 50 seconds), as can be seen from FIGS. 9c and 9d.

Figure 9E:
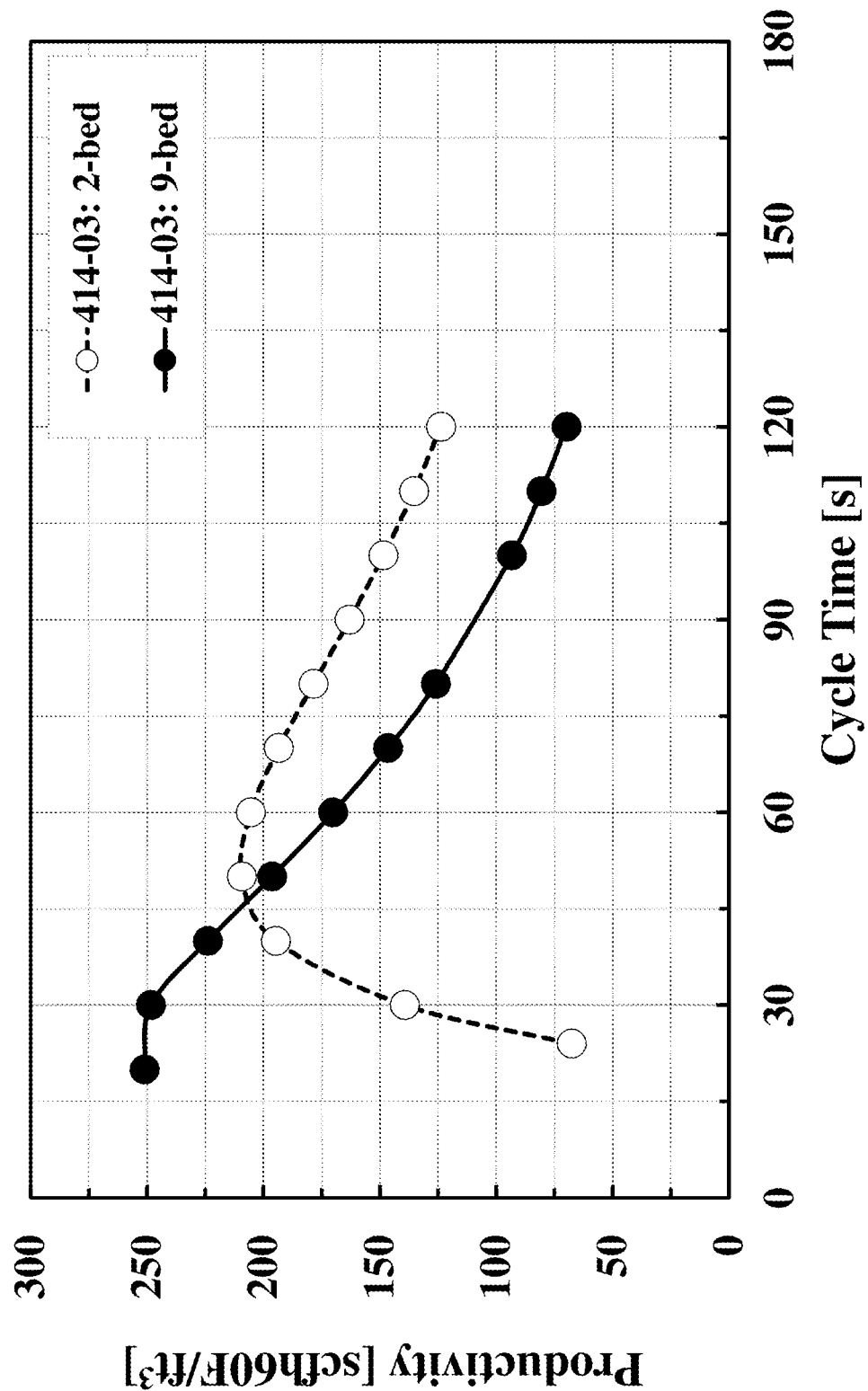
Figure 9F:
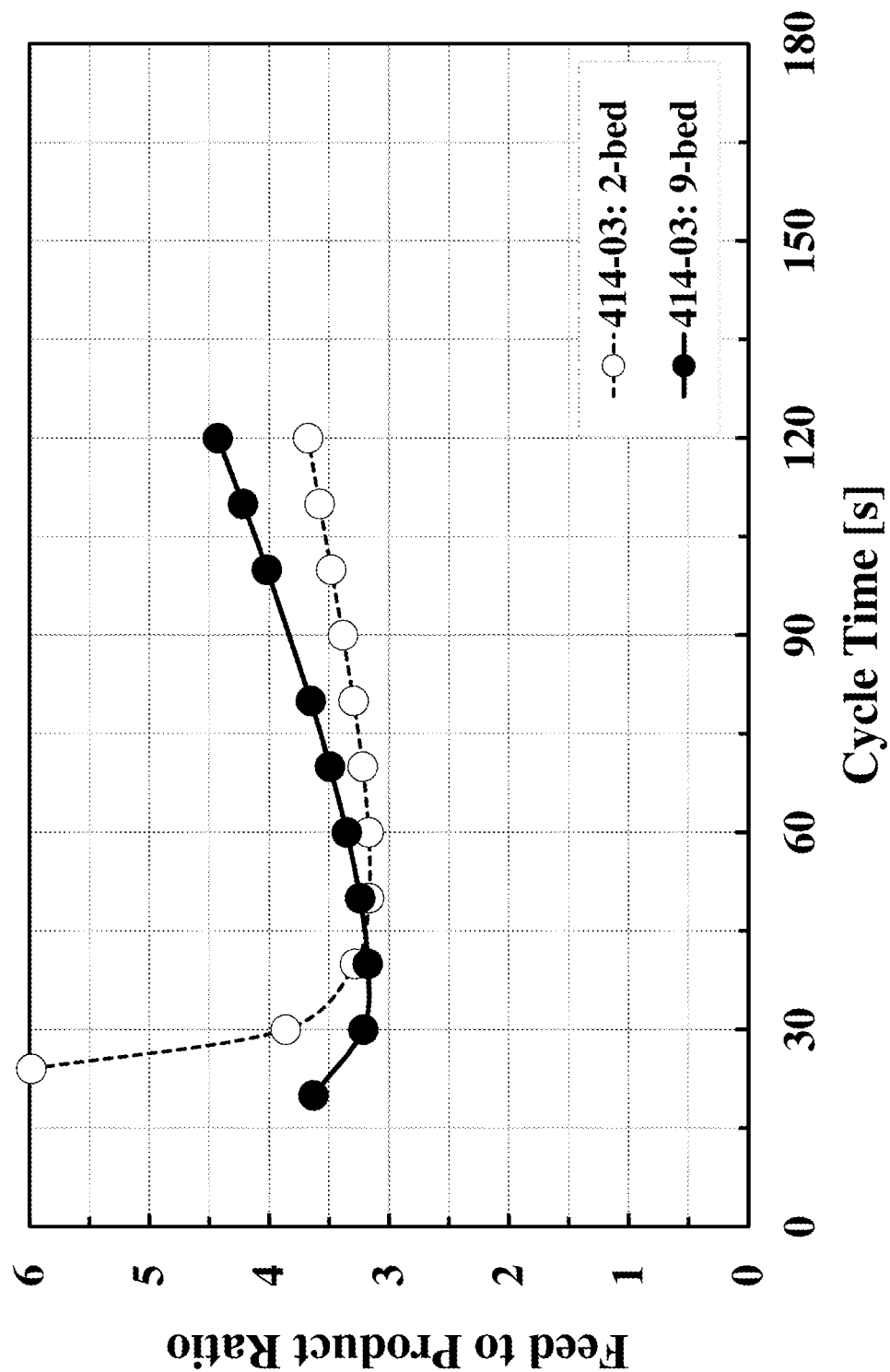

The 2-bed and 9-bed multi-step process performances using a similar rate but lower selective CMS adsorbent (414-03 CMS) are summarized in FIGS. 9e and 9f. Again, the process performance is evaluated for nitrogen product containing 4500 ppm oxygen at a temperature of 100° F. and a bed pressure of 7.80 atma. The bed geometry and other parameters are summarized in Table 1.

The 9-bed process again outperforms the 2-bed multi-step process. The loss in specific productivity and recovery is significant when 2-bed cycle is operated using faster cycle time. Due to the lower oxygen over nitrogen kinetic selectivity of the 414-03 CMS, the feed to product ratio is higher (as can be seen from FIG. 9f) versus the one with 414-02 as can be seen from FIG. 9d. However, the product recovery in the 414-03 CMS with 9-bed process is still a significant improvement upon the 2-bed slow CMS process, and the productivity is far superior for the 9-bed 414-03 CMS process.

Figure 10:
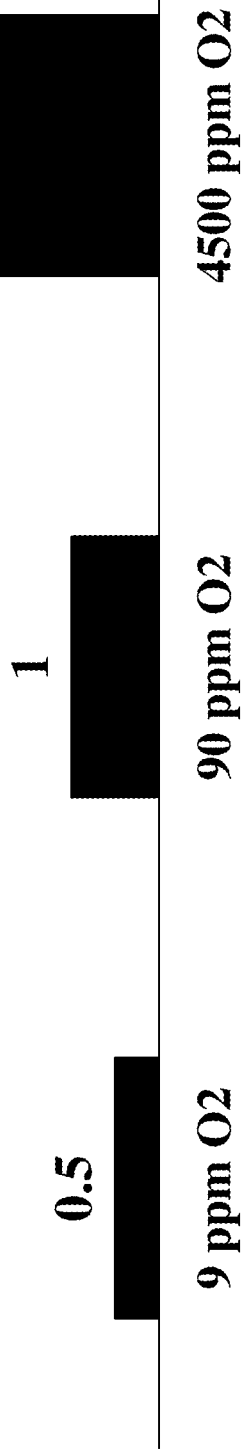
FIG. 10 is a graph showing purge requirement for producing nitrogen products containing different amounts of oxygen at 100° F. and 7.80 atma using a carbon molecular sieve adsorbent, 414-02 and the 9-bed PSA process cycle presented in FIG. 2.

A further advantageous feature of the fast CMS adsorbent coupled with the multi-bed multi-step RCPSA process is that the amount of purge gas needed to effectively push out the faster desorbing component (oxygen in case of air separation by CMS based PSA process) from the bed voids is surprisingly lower for the production of high purity nitrogen from air. FIG. 10 provides an overview of the purge gas requirement to produce product nitrogen containing different amount of oxygen (9 ppm, 90 ppm and 4500 ppm) at 100° F. and 7.80 atma using the 414-02 CMS adsorbent and the 9-bed RCPSA process cycle presented in FIG. 2. A bed length of 40 in and internal diameter (ID) of 4 in were used for this evaluation.

As shown in FIG. 10, about 75% less purge is required when oxygen content in the primary product gas decreases from 4500 ppm to 90 ppm. Even less purge is required when the primary product contains 9 ppm oxygen. Efficient regeneration of the bed due to faster oxygen kinetics of the fast CMS adsorbent coupled with the efficient multi-bed multi-step process cycle are identified as the main factors for less purge requirement to produce high purity primary product. It is noteworthy to mention that all the RCPSA process parameters (cycle time, all equalization valve constants, feed and product re-pressurization valve constants, and purge flow) are optimized individually for the three purge requirement cases reported in FIG. 10.

The extra column void in a conventional PSA process employing traditional valves is more than the PSA process employing rotary valve technology. The extra column void consists of: i) any dead volume in the bed at feed (inlet) or product (exit) end that does not contain adsorbent, ii) process gas transfer lines associated with the bed connecting the respective bed to each valve port in a rotary valve PSA process, and iii) any tuning or control valves or meters coupled with the process gas transfer line. The void volume greatly reduces process performance.

Figure 11A:
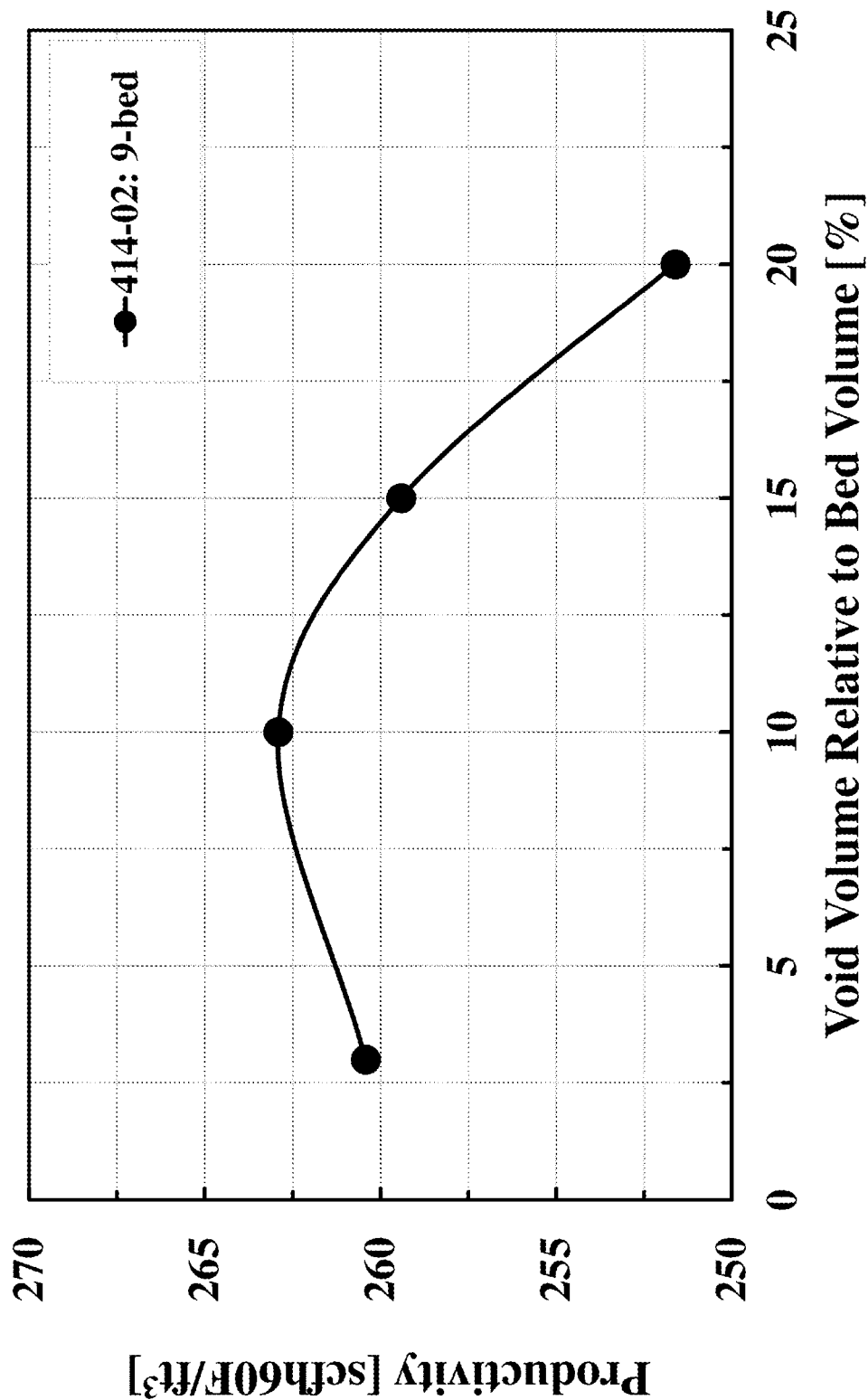
FIGS. 11a and 11b are graphs showing effect of void volume on process performances (in terms of "productivity" and "feed to product ratio") for producing nitrogen product containing 4500 ppm oxygen at 100° F. and 7.80 atma using a carbon molecular sieve adsorbent, 414-02 and the 9-bed PSA process cycle presented in FIG. 2.
Figure 11B:
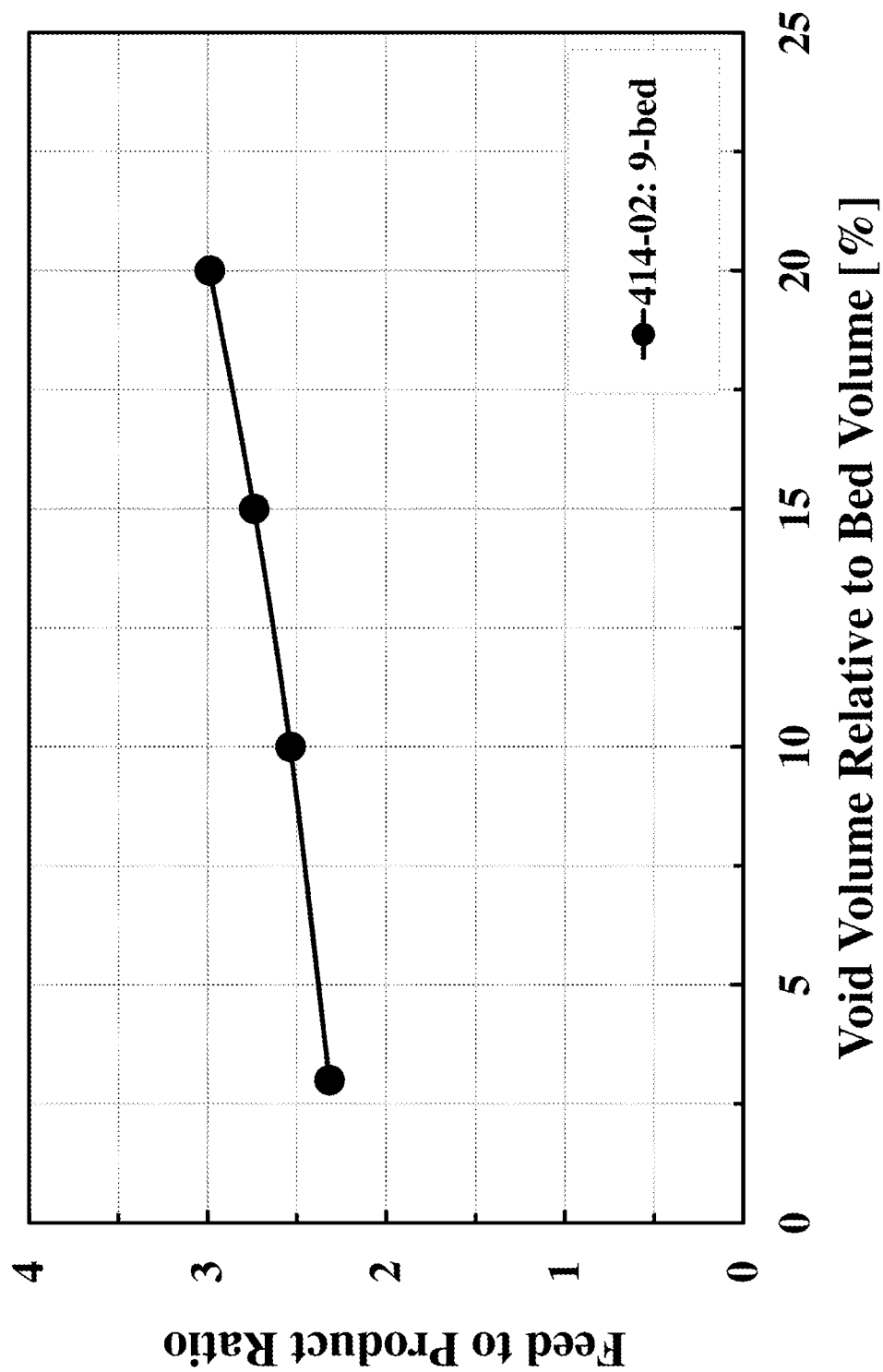

The effect of void volume on process performance was studied using a multi-bed multi-step RCPSA process employing rotary valve technology. FIGS. 11a and 11b show the effect of void volume on process performances in terms of "productivity" and "feed to product ratio" for producing nitrogen product containing 4500 ppm oxygen at 100° F. and 7.80 atma using the 414-02 carbon molecular sieve adsorbent and the 9-bed multi-step RCPSA process cycle presented in FIG. 2. The adsorbent characteristics for 414-02 CMS is summarized in Table 1. The bed length and internal diameter (ID) used for this evaluation are 40 in and 4 in, respectively. Note that the void volume in feed or product end is increased in same proportion during the study and presented as a percentage relative to one bed volume.

As shown in FIG. 11b, feed to product ratio increases (or recovery decreases) as the void volume is increased. However, a surprising finding is that there was a maximum productivity at a certain void volume (at ~10% void volume relative to bed volume, as can be seen from FIG. 11a) after which the productivity starts to decrease.

A 9-bed multi-step RCPSA process (with the cycle sequence presented in FIG. 2) employing rotary valve technology was built to evaluate process performance indicators using different CMS adsorbents. Each bed of the RCPSA process is 40 in height and 4 in internal diameter (ID). Three CMS adsorbents (414-04, 414-05, and 414-06) of different oxygen rates, oxygen over nitrogen kinetic selectivity, and equilibrium capacities (as shown in Table 2) were selected for performance evaluation for producing nitrogen of different purities (or containing different amount of oxygen) from air at 69.8° F. and 7.80 atma bed pressure. The 414-05 and 414-06 CMS adsorbents were evaluated using the 9-bed multi-step RCPSA process unit (the cycle sequence shown in FIG. 2) and the performances using these CMS adsorbents are compared with the 2-bed multi-step conventional process (FIG. 1) data generated using the 414-04 CMS adsorbent. Note that the bed height and internal diameter (ID) of the 2-bed process used for the evaluation are 120 in and 1.908 in, respectively.

The RCPSA process parameters such as cycle time or rotational speed, top and bottom equalization valve coefficients, feed and product re-pressurization valve coefficients and purge flow were individually optimized for each adsorbent at each purity, temperature and bed pressure. Note that there are no feed and product tanks with the RCPSA unit as the feed and product withdrawal are continuous. The 2-bed multi-step process parameters were also optimized in the same manner as the RCPSA process.

Figure 12A:
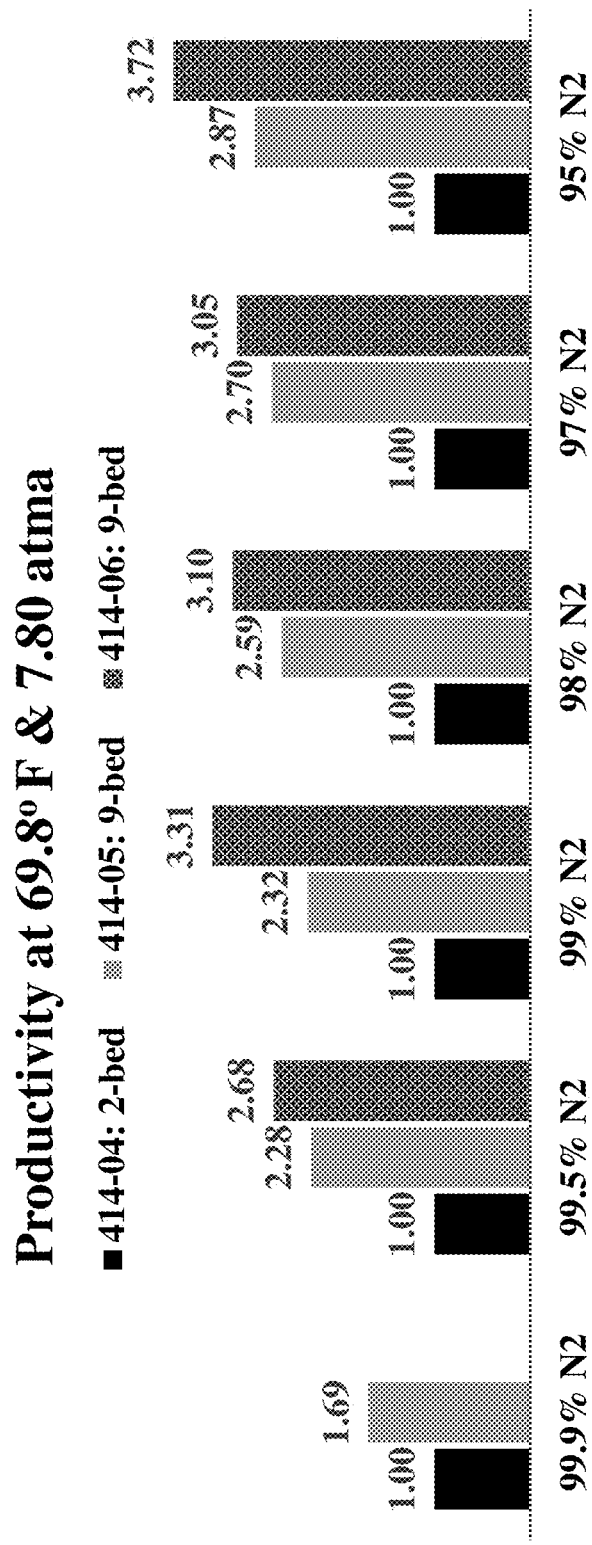
FIGS. 12a and 12b are graphs showing normalized performances (in terms of "productivity" and "feed to product ratio") at 69.8° F. and 7.80 atma for 414-05 and 414-06 "fast" carbon molecular sieve adsorbents from 9-bed pilot unit (bed length=40 in and bed ID=4.0 in). The performance for "slow" carbon molecular sieve adsorbent, 414-04 from 2-bed PSA cycle (bed length=120 in and bed ID=1.908 in) is also included.
Figure 12B:
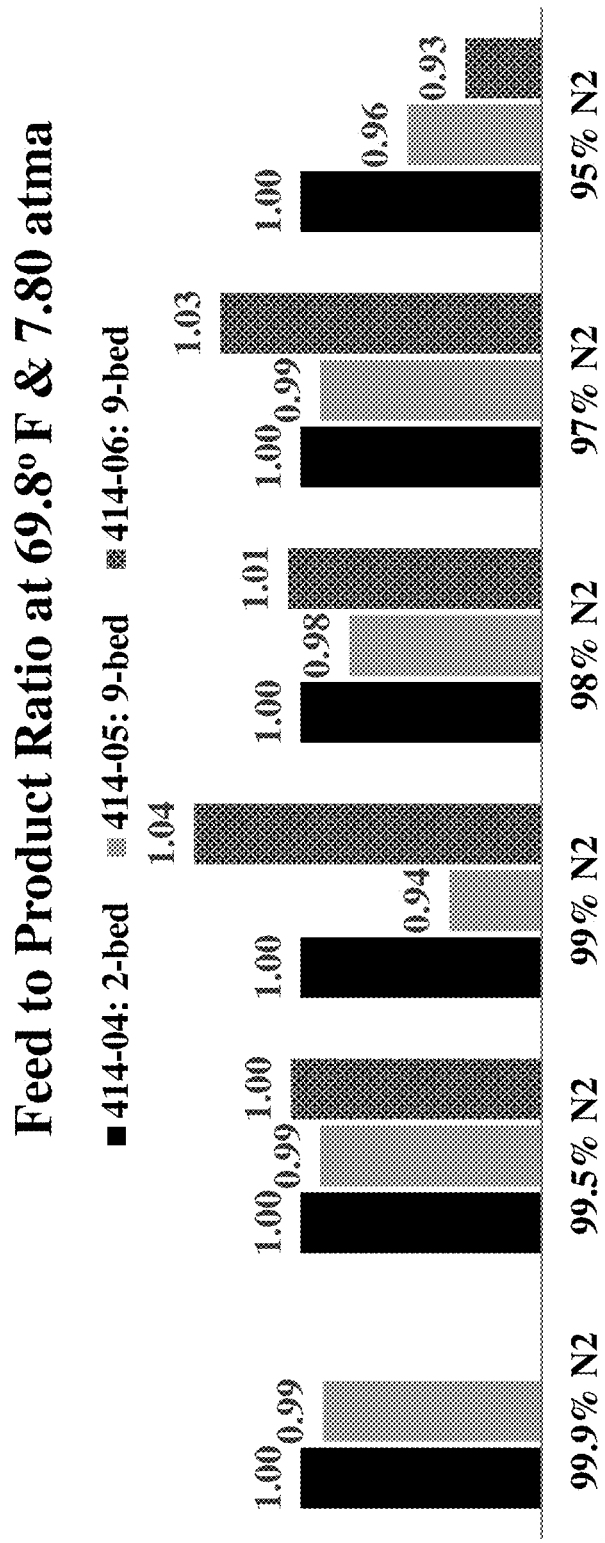

The process performance indicators in terms of the normalized productivity and normalized feed to product ratio for 414-04, 414-05, and 414-06 CMS adsorbents are summarized FIGS. 12a and 12b. At all product purities containing 95 to 99.9% nitrogen (or different amount of oxygen), the normalized productivities from the 9-bed multi-step process containing the fast CMS adsorbents (414-05 and 414-06) are significantly better than those on the slow CMS adsorbent (414-04) coupled with the conventional 2-bed process. The feed to product ratios with the aforementioned product purity ranges are similar or lower for the 9-bed process containing the fast CMS adsorbents.

The normalized productivities on the CMS adsorbents considered here decrease in the sequence of 414-06>414-05>414-04 as can be seen from FIG. 12a. This is consistent with uptake rate sequences (in decreasing order): 414-06>414-05>414-04 as can be seen from Table 2. The surprising feature is that the feed to product ratio is similar or lower even though the 414-05 and 414-06 CMS adsorbents have lower oxygen to nitrogen kinetic selectivity versus 414-04 CMS. Due to higher efficiency of the multi-bed multi-step process, it is possible to maintain equal or higher recovery (lower feed to product ratio) with the CMS adsorbent having lower kinetic selectivity.

Figure 13A:
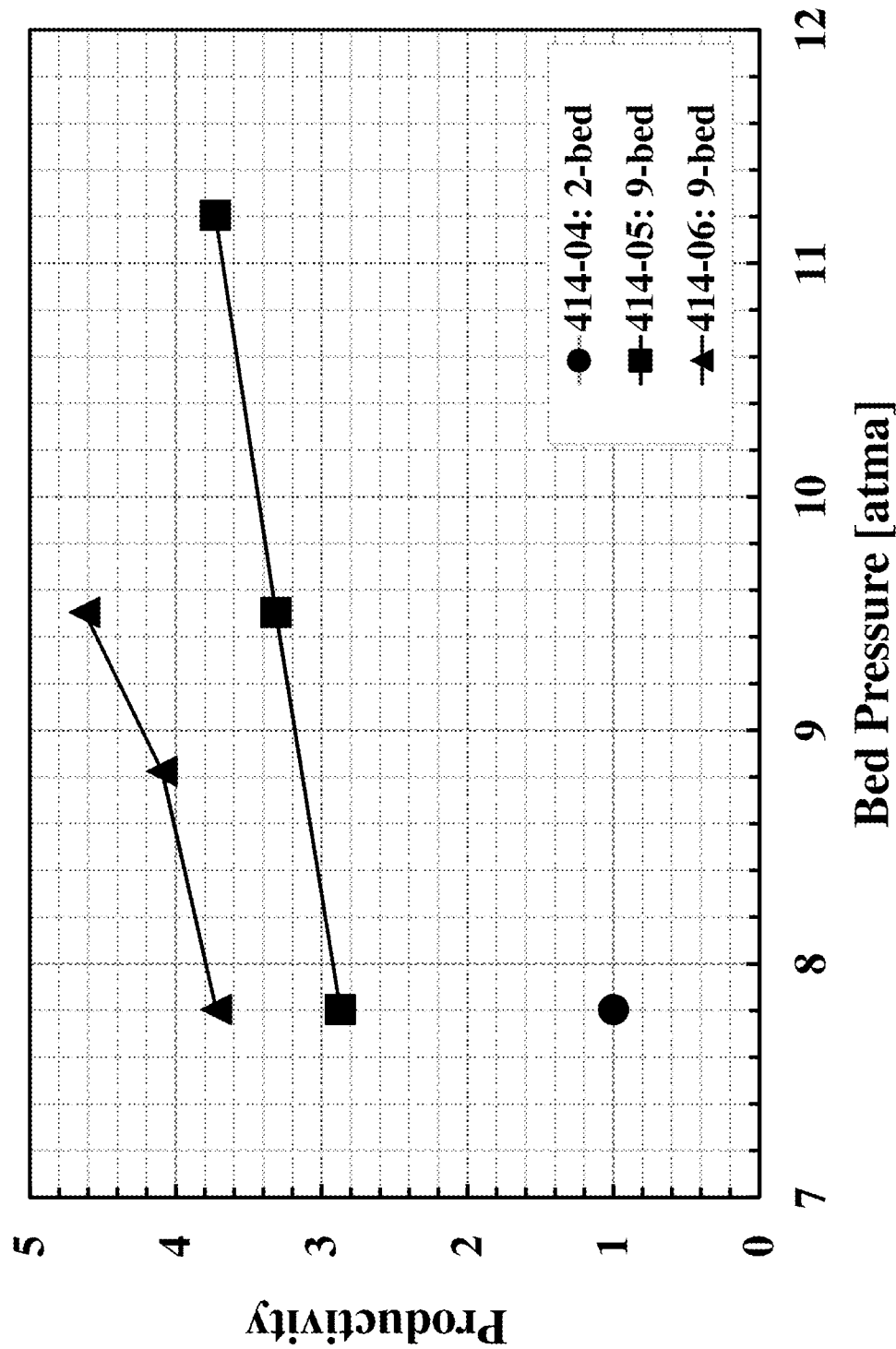
FIGS. 13a and 13b are graphs showing effect of bed pressure on performances (in terms of normalized "productivity" and normalized "feed to product ratio") at 69.8° F. and 7.80 atma producing nitrogen product containing 45,000 ppm oxygen using 414-05 and 414-06 carbon molecular sieve adsorbents from 9-bed pilot unit (bed length=40 in and bed ID=4.0 in). The performance for conventional carbon molecular sieve adsorbent, 414-04 producing nitrogen product containing 45,000 ppm oxygen at the same conditions from 2-bed PSA cycle (bed length=120 in and bed ID=1.908 in) is also included and used for normalizing all of the data.
Figure 13B:
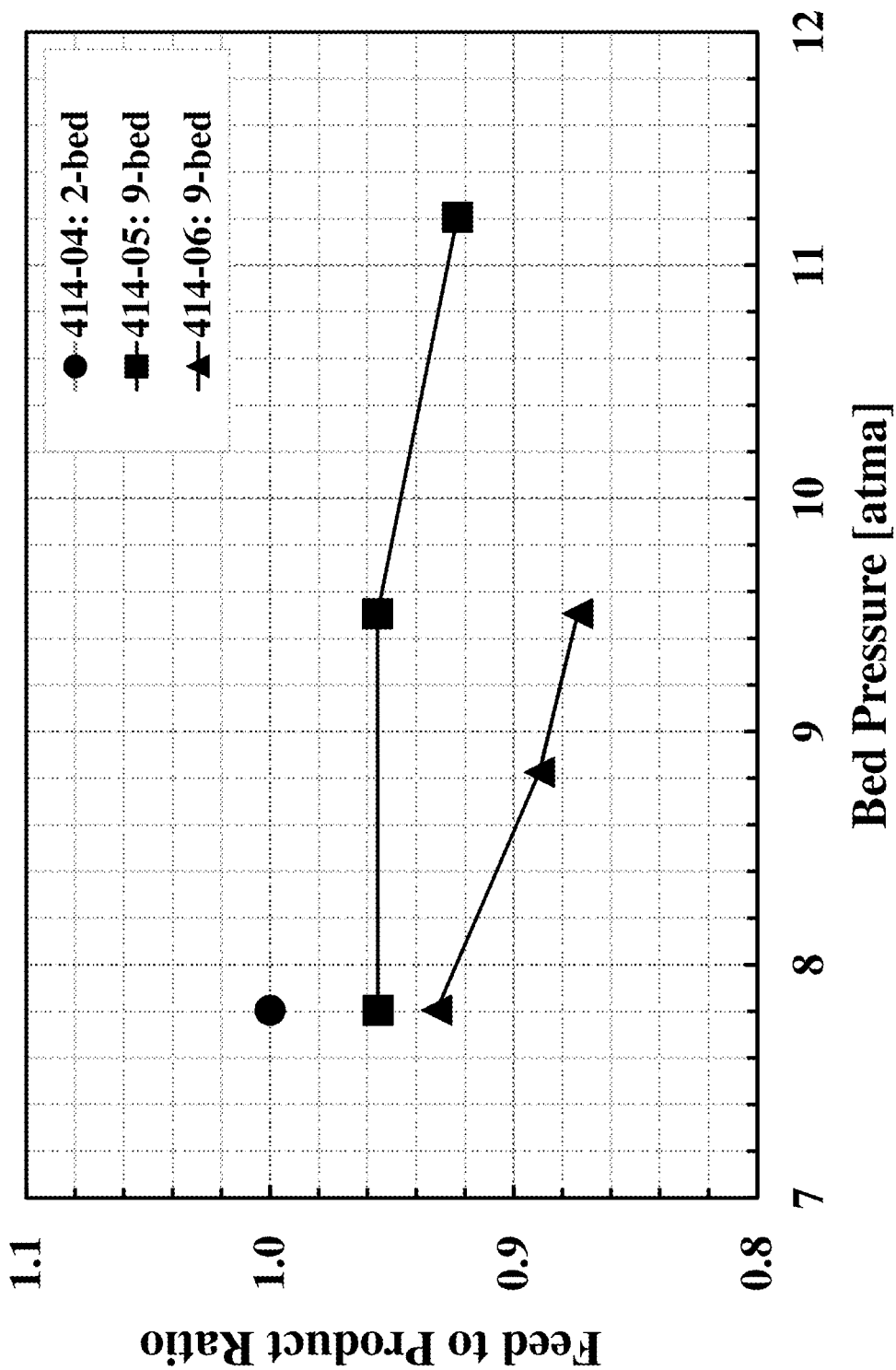

The effect of bed pressure on process performances are summarized in FIGS. 13a and 13b in terms of normalized specific productivity and feed to product ratio at 69.8° F. producing nitrogen product containing 45,000 ppm oxygen using the 414-05 and 414-06 carbon molecular sieve adsorbents, and the 9-bed multi-step RCPSA unit described above. The performance for "slow" carbon molecular sieve adsorbent producing nitrogen product containing 45,000 ppm oxygen at the same condition from the conventional 2-bed PSA process unit (bed length=120 in and bed ID=1.908 in) is also included. The cycle configurations for 2-bed and 9-bed processes are presented in FIGS. 1 and 2, respectively.

FIGS. 13a and 13b show that due to the higher oxygen uptake rate, the specific productivity of the fast 414-06 CMS is higher at all the pressure ranges. The interesting feature with the 414-06 CMS is that even though it has slightly lower oxygen over nitrogen selectivity, the feed to product ratio is lower than that on the 414-05 CMS adsorbent. Higher equilibrium capacity (18.5% higher versus 414-05 CMS as can be seen from Table 2) and reduced pressure drop (due to the use of bigger adsorbent particle: for 414-06 CMS particle size=0.0719 in and for 414-05 CMS, the particle size=0.0568 in) during the process are identified to be the main reasons for the observed trend. The 2-bed process using 414-04 CMS underperforms due to the slower oxygen rate and inefficient process.

Using the fast CMS adsorbent 414-02, the process performance evaluation study was conducted using the 9-bed, 7-bed, 4-bed and 18-bed multi-step cycle designs presented in FIG. 2, FIG. 3, FIG. 4, and FIG. 5, respectively, for the production of nitrogen of different purities (or containing different amount of oxygen) at different pressures, temperatures, and bed length to diameter ratios (or aspect ratios). The adsorbent characteristics are summarized in Table 1. The operating conditions as well as bed characteristics are presented in Table 3. Note that the RCPSA process parameters such as cycle time, top and bottom equalization valve coefficients, feed and product re-pressurization valve coefficients, and purge flow were optimized individually for each cycle design applied to operate at different temperature, pressure, and product oxygen purities. The evaluation summary from Table 3 are presented below.

For the 9-bed multi-step cycle producing nitrogen product containing 4500 ppm oxygen at 7.80 atma, the feed to product ratio changes from 2.32 to 2.05 when the temperature is changed from 100° F. to 30° F. (Case 8, Case 2, and Case 1). The corresponding specific productivity reduces from 260.42 to 242.10 scfh60F/ft³. Note that the length to internal diameter ratio (or aspect ratio) used for this evaluation is 10.

With the same operating conditions, same product specification, and same bed aspect ratio, the 18-bed multi-step process outperforms the 9-bed multi-step RCPSA process as can be seen from Cases 27 to 29 in Table 3.

For the 9-bed multi-step cycle producing nitrogen containing 90 ppm oxygen at 7.80 atma and 100° F., the bed aspect ratio (or length to internal diameter ratio) is varied from 2 to 18 (Cases 4 to 7). The feed to product ratio and specific productivity are optimum at the bed aspect ratio of 18 for nitrogen product containing 90 ppm oxygen. For the nitrogen product containing 4500 ppm oxygen (Cases 8 to 13), the optimum bed aspect ratio is 10 as can be seen from Case 8 from Table 3.

The 7-bed multi-step cycle outperforms the 9-bed multi-step cycle for the production of nitrogen containing 45,000 ppm oxygen at 100° F. and 11.21 atma (Cases 15 and 22). At similar feed to product ratio, about 13% improvement in specific productivity can be achieved with the 7-bed process. Even for the production of nitrogen containing 4500 ppm oxygen at 100° F. and 7.80 atma, about 14% better productivity can be achieved at lower feed to product ratio (or higher recovery) with the 7-bed multi-step cycle as can be seen from Cases 13 and 16 in Table 3.

The 7-bed multi-step cycle also outperforms 4-bed multi-step cycle for the production of nitrogen containing 4500 ppm oxygen at 100° F. and 7.80 atma (Cases 16 and 25).

Using the 7-bed multi-step process, a turndown study is conducted to produce nitrogen containing 45,000 ppm oxygen at 100° F. and 11.21 atma using the 414-02 CMS adsorbent. Turndown is required when productivity demand is lower than necessary. For a kinetic process, the power requirement (or feed to product ratio) may be higher with turndown mode if the process is not efficient. A summary of turndown evaluation study (Cases 31 to 41) is presented in Table 4 along with the optimum case (Case 30).

Table 4 shows that only about a 21.9% increase in feed to product ratio is observed when productivity is reduced to about 70% of the optimum case (Case 37). The turndown is conducted through changing operating parameters along with the cycle time as can be seen from Table 4.

The 9-bed multi-step RCPSA cycle designs presented in FIG. 2, FIG. 6, FIG. 7, and FIG. 8 were used to evaluate process performances for the production of pure argon from argon/oxygen/nitrogen mixture using a RHO based zeolite adsorbent. For these cycle designs, high pressure of 7.80 atma, low pressure of 1.05 atma and temperature of 100° F. are used for performance evaluation. The feed gas mixture contained 20 mole % $O_2$, 0.05 mole % $N_2$ and reminder Ar, and the final argon product contained 2 ppm $O_2$ as an impurity. A summary of bed and adsorbent characteristics as well as the operating conditions used to evaluate process performance is included in the Table 5. The process performance indicators in terms of Ar recovery and specific productivity are also added in the table. Note that for each cycle design, the RCPSA process parameters such as cycle time, top and bottom equalization valve coefficients, feed and product re-pressurization valve coefficients, and purge flow are individually optimized.

Table 5 demonstrates that all the recycle designs (cycles presented in FIGS. 6 to 8) outperform the cycle design without recycle presented in FIG. 2. Among the recycle options, the recycle to the fresh feed design presented in FIG. 6 is the preferred option as: i) with only 44.57% vent gas recycle, over 75% Ar recovery can be achieved with similar or better specific productivity versus other designs presented in FIGS. 7 and 8, ii) vent gas can be mixed with low pressure crude argon feed and then the combined feed can be recompressed by a single compressor, therefore, no extra machinery is required, and iii) simple control scheme can be implemented as the feed step is operated at a constant pressure, but for the cycle designs in FIGS. 7 and 8, the vent gas is recycled back to pressure changing steps which might add some control complexity.

While the principles of the invention have been described above in connection with preferred embodiments, it is to be clearly understood that this description is made only by way of example and not as a limitation of the scope of the invention.

TABLE 1

Summary of adsorbent and bed characteristics as well as operating condition for 414-01, 414-02, and 414-03 carbon molecular sieve adsorbents.

| Adsorbent type (—) | 414-01 | 414-02 | 414-03 |
|---|---|---|---|
| Adsorbent Characteristics | | | |
| Adsorbent diameter (ft) | 0.0043 | 0.0043 | 0.0043 |
| Total void fraction (—) | 0.5311 | 0.5311 | 0.5311 |
| Interstitial void fraction (—) | 0.3019 | 0.3019 | 0.3019 |
| Bulk density (lb/ft$^3$) | 41.92 | 41.92 | 41.92 |
| LDF rate constant at 1.0 atma & 86° F. for | | | |
| Oxygen (1/s) | 0.1102 | 0.2204 | 0.2204 |
| Nitrogen (1/s) | 0.0068 | 0.0136 | 0.0272 |
| Argon (1/s) | 0.0046 | 0.0092 | 0.0184 |
| $O_2/N_2$ kinetic selectivity | 16.21 | 16.21 | 8.10 |
| Bed Characteristics | | | |
| Bed length (in) | 40 | 40 | 40 |
| Bed inside diameter (in) | 4 | 4 | 4 |
| Operating Condition | | | |
| Pressure (atma) | 7.80 | 7.80 | 7.80 |
| Temperature (° F.) | 100 | 100 | 100 |
| Product $O_2$ (ppm) | 4500 | 4500 | 4500 |

TABLE 2

Summary of the linear driving force (LDF) model based $O_2$ rate constants, $O_2$ over $N_2$ kinetic selectivity and equilibrium capacity of $O_2$ on 414-04, 414-05, and 414-06 carbon molecular sieve adsorbents at 1 atma and 86° F.

| CMS | Description | LDF rate constant for $O_2$ (1/s) | $O_2/N_2$ kinetic selectivity | Equilibrium capacity of $O_2$ (mmol/gm) |
|---|---|---|---|---|
| 414-04 | Slow CMS | 0.1761 | 38.28 | 0.3138 |
| 414-05 | Fast CMS | 0.2613 | 27.30 | 0.2822 |
| 414-06 | Fast CMS | 0.3426 | 24.08 | 0.3344 |

TABLE 3

Summary of performances (in terms of "productivity" and "feed to product ratio") at different product oxygen impurities for 414-02 carbon molecular sieve adsorbent using 4-bed (presented in FIG. 4), 7-bed (presented in FIG. 3), 9-bed (presented in FIG. 2), and 18-bed (presented in FIG. 5) PSA process cycles.

| Adsorbent | No. of Beds | Pressure (atma) | Temperature (° F.) | Bed Length (in) | Bed ID (in) | Cycle Time (s) | Product $O_2$ (ppm) | Feed to Product Ratio | Productivity (scfh60 F/ft$^3$) | Case No. |
|---|---|---|---|---|---|---|---|---|---|---|
| 414-02 | 9 | 7.80 | 30 | 40 | 4 | 50 | 4500 | 2.05 | 242.10 | 1 |
| | | | 70 | 40 | 4 | 50 | 4500 | 2.12 | 257.45 | 2 |
| | | | 100 | 72 | 19 | 40 | 9 | 5.14 | 73.73 | 3 |
| | | | | 40 | 20 | 40 | 90 | 3.70 | 116.62 | 4 |
| | | | | 60 | 20 | 35 | | 3.84 | 112.32 | 5 |
| | | | | 72 | 4 | 45 | | 3.45 | 121.83 | 6 |
| | | | | 72 | 19 | 40 | | 3.84 | 105.31 | 7 |
| | | | | 40 | 4 | 40 | 4500 | 2.32 | 260.42 | 8 |
| | | | | 40 | 20 | 25 | | 2.58 | 276.53 | 9 |
| | | | | 40 | 20 | 40 | | 2.41 | 237.58 | 10 |
| | | | | 60 | 20 | 30 | | 2.56 | 255.99 | 11 |
| | | | | 60 | 30 | 35 | | 2.46 | 234.65 | 12 |
| | | | | 72 | 19 | 35 | | 2.61 | 243.79 | 13 |
| | | 11.21 | | 60 | 30 | 35 | 45000 | 1.75 | 503.33 | 14 |
| | | | | 72 | 19 | 35 | | 1.73 | 972.58 | 15 |
| 414-02 | 7 | 7.80 | 100 | 72 | 19 | 30 | 4500 | 2.58 | 279.04 | 16 |
| | | 9.51 | 107.6 | 72 | 19 | 16 | 45000 | 2.00 | 976.41 | 17 |
| | | | | 72 | 19 | 18 | | 1.92 | 974.95 | 18 |
| | | | | 72 | 19 | 20 | | 1.87 | 965.15 | 19 |
| | | | | 72 | 19 | 22 | | 1.84 | 950.12 | 20 |
| | | | | 72 | 19 | 24 | | 1.81 | 931.88 | 21 |
| | | 11.21 | 100 | 72 | 19 | 25 | | 1.75 | 1101.48 | 22 |
| 414-02 | 4 | 7.80 | 100 | 60 | 10 | 40 | 90 | 3.93 | 127.26 | 23 |
| | | | | 60 | 12 | 40 | | 3.91 | 127.05 | 24 |
| | | | | 60 | 10 | 40 | 4500 | 2.61 | 278.06 | 25 |
| | | 11.21 | | 60 | 10 | 32 | 27000 | 1.91 | 807.03 | 26 |
| 414-02 | 18 | 7.80 | 30 | 40 | 4 | 60 | 4500 | 1.94 | 245.53 | 27 |
| | | | 70 | 40 | 4 | 50 | | 2.06 | 280.70 | 28 |
| | | | 100 | 40 | 4 | 40 | | 2.24 | 275.96 | 29 |

Table 4. Summary of optimum (Case 30) and turndown (Cases 31 to 41) performances in terms of "productivity" and "feed to product ratio" for 7-bed process cycle (presented in FIG. 3) using 414-02 carbon molecular sieve adsorbent for producing nitrogen product containing 45,000 ppm oxygen at 100° F. and 11.21 atma.
See Table 4 on Page 36.

TABLE 5

Summary of RHO based adsorbent characteristics, bed characteristics, operating conditions, and process performance (in terms of "productivity" and "Ar recovery") for the separation of Ar from an $O_2/N_2/Ar$ mixture using 9-bed multi-step process cycles shown in FIG. 2, FIG. 6, FIG. 7, and FIG. 8.

| Adsorbent Characteristics | |
|---|---|
| Adsorbent type (—) | $Li_{5.2}Zn_{1.8}H_{0.5}Na_{0.5}$ RHO (3.9) |
| Adsorbent diameter (ft) | 0.0066 |
| Total void fraction (—) | 0.65 |
| Interstitial void fraction (—) | 0.40 |
| Bulk density (lb/ft³) | 50 |
| LDF rate constant at 1.0 atma & 86° F. for | |
| Oxygen (1/s) | 3.478 |
| Nitrogen (1/s) | 0.06269 |
| Argon (1/s) | 0.00668 |
| Bed Characteristics | |
| Bed length (in) | 72 |
| Bed inside diameter (in) | 19 |
| Operating Conditions | |
| Temperature (° F.) | 100 |
| High pressure (atma) | 7.80 |
| Low pressure (atma) | 1.05 |
| Feed mole fraction of $O_2$ | 0.20 |
| Feed mole fraction of $N_2$ | 0.0005 |
| Feed mole fraction of Ar | 0.7995 |

| Process performance indicators | | | | |
|---|---|---|---|---|
| Cycle schedule | FIG. 2 | FIG. 6 | FIG. 7 | FIG. 8 |
| Cycle time (s) | 50 | 45 | 40 | 40 |
| Product $O_2$ (ppm) | 2 | 2 | 2 | 2 |
| Recycle amount (%) | 0 | 44.57 | 49.93 | 49.32 |
| Ar Recovery (%) | 61.73 | 75.22 | 75.01 | 70.69 |
| Productivity (scfh60 F./ft³) | 302.63 | 305.73 | 308.83 | 294.13 | having an $O_2$ adsorption rate (1/s) of at least 0.20 as determined by linear driving force model at 1 atma and 86° F., and wherein the RCPSA process comprises subjecting each of the adsorption beds to a rapid PSA cycle comprising the following steps carried out in the following sequence:
  i) feed
  ii) a first equalization depressurization
  iii) a second equalization depressurization
  iv) counter-current depressurization
  v) counter-current purge
  vi) a first equalization re-pressurization
  vii) a second equalization re-pressurization
  viii) product and/or feed re-pressurization
  wherein when an adsorbent bed is undergoing equalization depressurization step ii) it is connected with and provides a re-pressurization stream to one of the other adsorbent beds that is concurrently undergoing equalization re-pressurization step vii), and
  when an adsorbent bed is undergoing equalization depressurization step iii) it is connected with and provides a re-pressurization stream to another one of the other adsorbent beds that is concurrently undergoing equalization re-pressurization step vi).

2. The RCPSA process of claim 1, wherein step iii) is a dual equalization depressurization step and step vi) is a dual equalization re-pressurization step.

3. The RCPSA process of claim 1, wherein step viii) is a product and feed re-pressurization step.

4. The RCPSA process of claim 1, wherein step ii) is a co-current equalization depressurization step and step vii) is a counter-current equalization re-pressurization step.

5. The RCPSA process of claim 1, wherein the process utilizes from 5 to 18 adsorption beds.

6. The RCPSA process of claim 1, wherein the process utilizes from 7 to 9 adsorption beds.

7. The RCPSA process of claim 1, wherein the process utilizes 7 or 9 adsorption beds.

8. The RCPSA process of claim 1, wherein the duration of the feed step is from 3 to 45 seconds.

9. The RCPSA process of claim 1, wherein the duration of each of the equalization depressurization and equalization re-pressurization steps is from 1 and 5 seconds.

TABLE 4

| Adsorbent | No. of Beds | Pressure (atma) | Temperature (° F.) | Bed Length (in) | Bed ID (in) | Purge Flow (lbmol/h) | Top Equalization CV | Bottom Equalization CV | Product Re-pressurization CV | Product $O_2$ (ppm) | Cycle Time (s) | Feed to Product Ratio | Productivity (scfh60 F/ft³) | Case No. |
|---|---|---|---|---|---|---|---|---|---|---|---|---|---|---|
| 414-02 | 7 | 11.21 | 100 | 72 | 19 | 10 | 5 | 1 | 20 | 45000 | 25 | 1.75 | 1101.48 | 30 |
| 414-02 | 7 | 11.21 | 100 | 72 | 19 | 0 | 6 | 2 | 5 | 45000 | 25 | 2.46 | 428.62 | 31 |
| | | | | | | | | | | | 30 | 2.34 | 414.22 | 32 |
| | | | | | | | | | | | 35 | 2.29 | 396.62 | 33 |
| | | | | | | | | | | | 40 | 2.26 | 378.63 | 34 |
| | | | | | | | | | | | 45 | 2.25 | 361.08 | 35 |
| | | | | | | | | | | | 50 | 2.24 | 344.20 | 36 |
| | | | | | | | | | | | 55 | 2.24 | 328.03 | 37 |
| | | | | | | | | | | | 60 | 2.25 | 312.54 | 38 |
| | | | | | | | | | | | 70 | 2.27 | 283.57 | 39 |
| | | | | | | | | | | | 80 | 2.30 | 257.19 | 40 |
| | | | | | | | | | | | 90 | 2.33 | 233.30 | 41 |

The invention claimed is:

1. A multi-bed rapid cycle pressure swing adsorption (RCPSA) process for separating $O_2$ from $N_2$ and/or Ar, wherein the process utilizes at least five adsorption beds each comprising a kinetically selective adsorbent for $O_2$ 10. The RCPSA process of claim 1, wherein the cycle time of the rapid PSA cycle is equal to or less than 100 seconds.

11. The RCPSA process of claim 1, wherein the feed step is performed at a temperature of 0° F. to 125° F.

12. The RCPSA process of claim 1, wherein the feed step is performed at a temperature of 20° F. to 100° F.

13. The RCPSA process of claim 1, wherein the feed step is performed at a temperature of 20° F. to 40° F.

14. The RCPSA process of claim 1, wherein during all or part of the feed step a recycle gas is introduced co-currently into the bed undergoing the feed step, the recycle gas comprising gas obtained during the counter-current depressurization step and/or purge step from the beds undergoing said steps.

15. The RCPSA process of claim 1, wherein during all or part of equalization depressurization step ii) a recycle gas is introduced co-currently into the bed undergoing said step, the recycle gas comprising gas obtained during the counter-current depressurization step and/or purge step from the beds undergoing said steps.

16. The RCPSA process of claim 1, wherein the kinetically selective adsorbent has an $O_2/N_2$ kinetic selectivity of at least 5 as determined by linear driving force model at 1 atma and 86° F., and/or $O_2/Ar$ kinetic selectivity of at least 5 as determined by linear driving force model at 1 atma and 86° F.

17. The RCPSA process of claim 1, wherein the kinetically selective adsorbent is a zeolite or a carbon molecular sieve.

18. The RCPSA process of claim 1, wherein the process is for separating $O_2$ from Ar, and the kinetically selective adsorbent is a RHO zeolite having a Si/Al ratio of from 3.2 to 4.5 and containing non-proton extra-framework cations, wherein the zeolite contains at most 1 proton per unit cell, and wherein the size, number and charge of the extra-framework cations that are present in the zeolite are such that 1 or fewer non-proton extra-framework cations per unit cell are required to occupy 8-ring sites.

19. The RCPSA process of claim 1, wherein the process is for separating $O_2$ from $N_2$, and the kinetically selective adsorbent is a carbon molecular sieve (CMS) having an $O_2/N_2$ kinetic selectivity of from 5 to 30 as determined by linear driving force model at 1 atma and 86° F.

20. The RCPSA process of claim 1, wherein the process is a rotary bed RCPSA process.

21. The RCPSA process of claim 1, wherein the process is a rotary valve RCPSA process.

22. The RCPSA process of claim 1, wherein each adsorbent bed has a void volume relative to bed volume of 3% to 15%.

23. The RCPSA process of claim 1, wherein the process utilizes seven adsorption beds, and wherein the RCPSA process comprises subjecting each of the beds to a rapid PSA cycle comprising the following steps carried out in the following sequence:
feed (F);
co-current equalization depressurization (EQD1);
dual equalization depressurization (DEQD2);
counter-current depressurization (CnD);
counter-current purge (PU);
dual equalization re-pressurization (DEQR2);
counter-current equalization re-pressurization (EQR1); and
product and feed re-pressurization (RP/F);
wherein when an adsorbent bed is undergoing the co-current equalization depressurization (EQD1) step it is connected with and provides a counter-current re-pressurization stream to one of the other adsorbent beds that is concurrently undergoing the counter-current equalization re-pressurization (EQR1) step, and wherein when an adsorbent bed is undergoing the dual equalization depressurization (DEQD2) step it is connected with and provides co-current and counter-current re-pressurization streams to another one of the other adsorbent beds that is concurrently undergoing the dual equalization re-pressurization (DEQR2) step.

24. The RCPSA process of claim 1, wherein the process utilizes nine adsorption beds, and wherein the RCPSA process comprises subjecting each of the beds to a rapid PSA cycle comprising the following steps carried out in the following sequence:
feed (F);
co-current equalization depressurization (EQD1);
first dual equalization depressurization (DEQD2);
second dual equalization depressurization (DEQD3);
counter-current depressurization (CnD);
counter-current purge (PU);
first dual equalization re-pressurization (DEQR3);
second dual equalization re-pressurization (DEQR2);
counter-current equalization re-pressurization (EQR1); and
product and feed re-pressurization (RP/F);
wherein when an adsorbent bed is undergoing the co-current equalization depressurization (EQD1) step it is connected with and provides a counter-current re-pressurization stream to one of the other adsorbent beds that is concurrently undergoing the counter-current equalization re-pressurization (EQR1) step, and wherein when an adsorbent bed is undergoing the first dual equalization depressurization (DEQD2) step it is connected with and provides co-current and counter-current re-pressurization streams to another one of the adsorbent beds that is concurrently undergoing the second dual equalization re-pressurization (DEQR2) step, and
wherein when an adsorbent bed is undergoing the second dual equalization depressurization (DEQD3) step it is connected with and provides a co-current and counter-current re-pressurization streams to yet another one of the adsorbent beds that is concurrently undergoing the first dual equalization re-pressurization (DEQR3) step.

* * * * *